United States Patent
Tsukioka

(10) Patent No.: US 8,280,162 B2
(45) Date of Patent: Oct. 2, 2012

(54) IMAGE PROCESSING APPARATUS AND RECORDING MEDIUM RECORDING IMAGE PROCESSING PROGRAM

(75) Inventor: Taketo Tsukioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 488 days.

(21) Appl. No.: 12/558,067

(22) Filed: Sep. 11, 2009

(65) Prior Publication Data

US 2010/0040283 A1    Feb. 18, 2010

Related U.S. Application Data

(63) Continuation of application No. PCT/JP2008/054447, filed on Mar. 12, 2008.

(30) Foreign Application Priority Data

Mar. 13, 2007  (JP) ................................. 2007-063816

(51) Int. Cl.
*G06T 5/00* (2006.01)
(52) U.S. Cl. ....................................... 382/167; 382/275
(58) Field of Classification Search .................. 382/162, 382/167, 254, 266, 275
See application file for complete search history.

(56) References Cited

U.S. PATENT DOCUMENTS

| | | | |
|---|---|---|---|
| 5,619,280 A * | 4/1997 | Yamashita et al. ............ | 348/645 |
| 5,691,779 A | 11/1997 | Yamashita et al. | |
| 2004/0008282 A1* | 1/2004 | Kawabata et al. ............ | 348/625 |
| 2004/0057061 A1* | 3/2004 | Bochkarev ..................... | 358/1.9 |
| 2005/0265628 A1* | 12/2005 | Takahashi ..................... | 382/275 |
| 2006/0233456 A1* | 10/2006 | Ahn et al. ..................... | 382/275 |

FOREIGN PATENT DOCUMENTS

| | | |
|---|---|---|
| EP | 0 677 972 A2 | 10/1995 |
| JP | 07-288837 A | 10/1995 |
| JP | 2001-118062 A | 4/2001 |
| JP | 2007-006158 A | 1/2007 |

OTHER PUBLICATIONS

Lee et al. "Two-Stage False Contour Detection Using Directional Contrast Features and Its Application to Adaptive False Contour Reduction." IEEE Transactions on Consumer Electronics, vol. 52, No. 1, Feb. 2006, pp. 179-188.*
English Language International Search Report dated Apr. 8, 2008 issued in parent Appln. No. PCT/JP2008/054447.

* cited by examiner

*Primary Examiner* — Jon Chang
(74) *Attorney, Agent, or Firm* — Holtz, Holtz, Goodman & Chick, PC

(57) ABSTRACT

An image processing apparatus includes a histogram calculating section, a tone curve determining section and a tone curve applying section that perform different tone corrections on pixels at different positions in a color image and a false contour detecting section that calculates the degree of false contour occurrence for the color image based on the difference in signal saturation level between color signals. Based on the result of the calculation by the false contour detecting section, the tone curve determining section controls the tone correction characteristics to make a false contour less prominent.

15 Claims, 15 Drawing Sheets

INPUT PIXEL VALUE x

IMAGE PROCESSING APPARATUS AND RECORDING MEDIUM RECORDING IMAGE PROCESSING PROGRAM

CROSS REFERENCE TO RELATED APPLICATION

This application is a continuation application of PCT/JP2008/054447 filed on Mar. 12, 2008 and claims benefit of Japanese Application No. 2007-063816 filed in Japan on Mar. 13, 2007, the entire contents of which are incorporate herein by this reference.

BACKGROUND OF THE INVENTION

1. Field of the Invention

The present invention relates to an image processing apparatus and a recording medium recording an image processing program that process a color static image or color dynamic image to provide a desired tone.

2. Description of the Related Art

Image pickup apparatuses, such as digital cameras, have been remarkably developed in recent years. However, they have not yet achieved as high dynamic range as that of human vision. For example, when a flash is used to shoot a static image, closer ranges are brightly illuminated and further ranges are poorly illuminated. And it is difficult to reproduce the same tone as that perceived by human vision both in the closer ranges and the farther ranges in the static image.

Space-variant tone conversion recently proposed is a solution to the problem. For example, in Japanese Patent Application Laid-Open Publication No. 2001-118062, there is a technique described of analyzing the texture of an input image, dividing the input image into a plurality of regions based on the result of the analysis, and performing a different density conversion processing on each of the divisional regions. According to the technique, even when a scene includes parts considerably different in brightness, the tones can be faithfully reproduced both in the bright parts and the dark parts, and an image of a subject close to that perceived by human vision can be produced.

SUMMARY OF THE INVENTION

An image processing apparatus according to an aspect of the present invention is an image processing apparatus that processes a color image composed of color signals of a plurality of colors, including tone correcting means that performs different tone corrections on pixels at different positions in the color image, false contour detecting means that calculates the degree of false contour occurrence for the color image based on the difference in signal saturation level between the color signals, and controlling means that controls characteristics of the tone corrections based on the result of the calculation by the false contour detecting means.

A recoding medium recording an image processing program according to another aspect of the present invention is a recording medium recording an image processing program that makes a computer process a color image composed of color signals of a plurality of colors, in which the image processing program makes the computer perform a tone correcting step of performing different tone corrections on pixels at different positions in the color image, a false contour index calculating step of calculating the degree of false contour occurrence for the color image based on the difference in signal saturation level between the color signals, and a controlling step of controlling characteristics of the tone corrections based on the result of the calculation in the false contour index calculating step.

DETAILED DESCRIPTION OF THE PREFERRED EMBODIMENTS

In the following, embodiments of the present invention will be described with reference to the drawings.

[Embodiment1]

Figure 1:
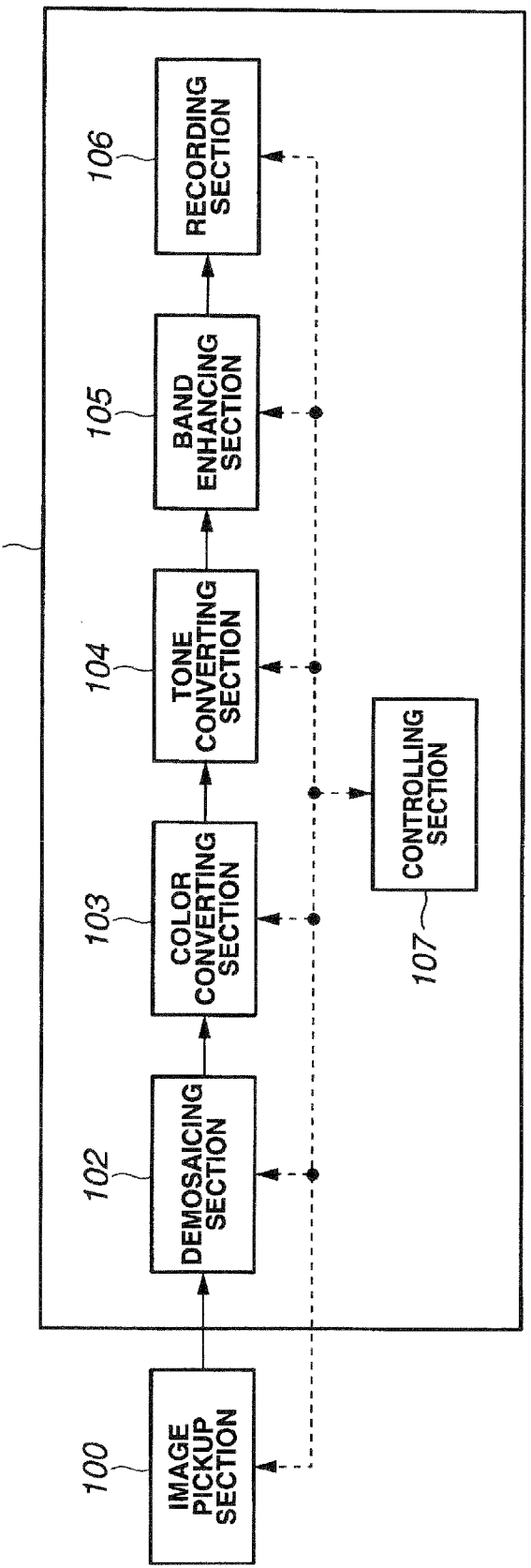
FIG. 1 is a block diagram showing a configuration of an image processing apparatus according to an embodiment 1 of the present invention.
Figure 2:
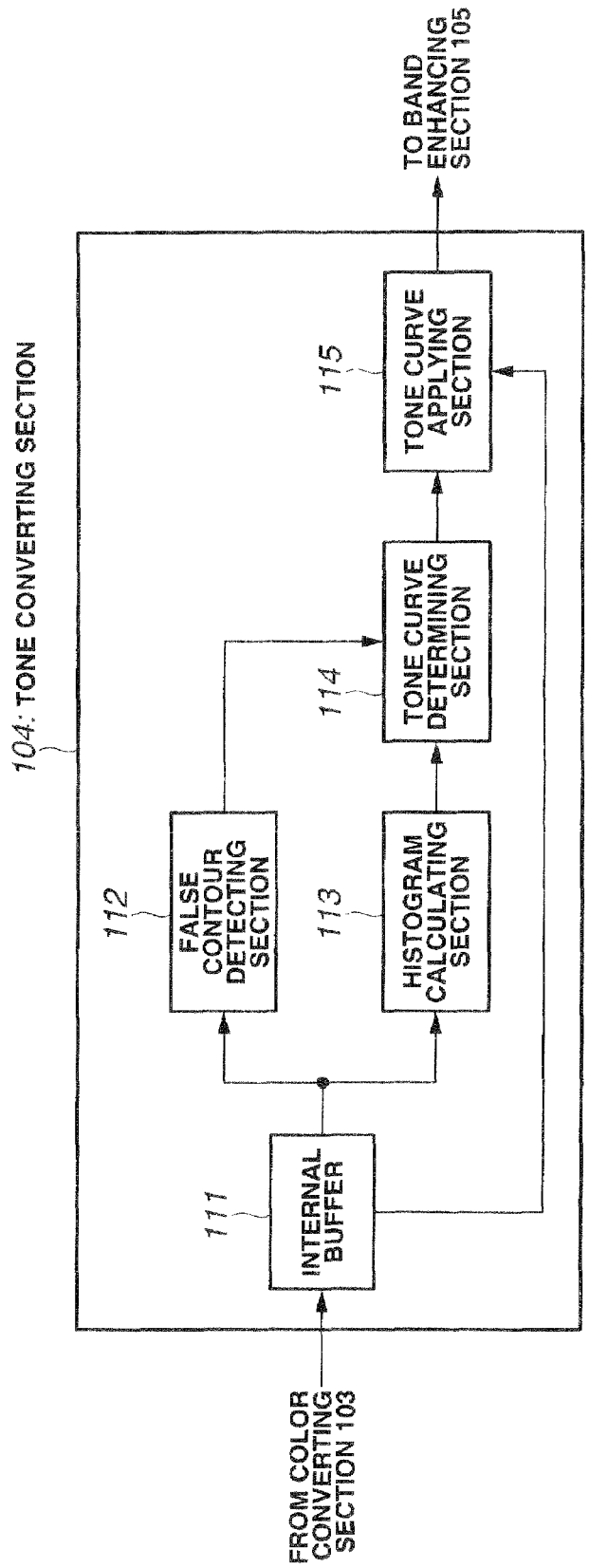
FIG. 2 is a block diagram showing a configuration of a tone converting section according to the embodiment 1.
Figure 3:
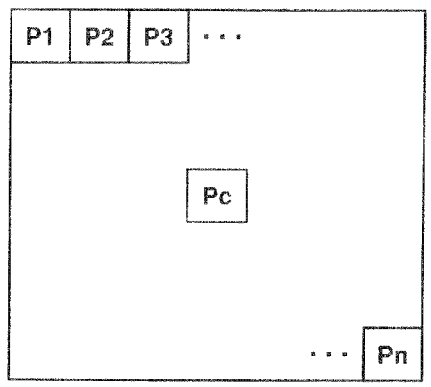
FIG. 3 shows a vicinity of a processing target pixel used by the tone converting section for false contour detection and histogram calculation according to the embodiment 1.
Figure 4:
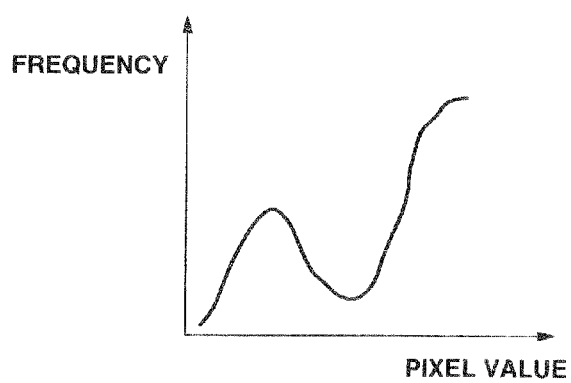
FIG. 4 is a graph showing an example of a histogram calculated by a histogram calculating section according to the embodiment 1.
Figure 5:
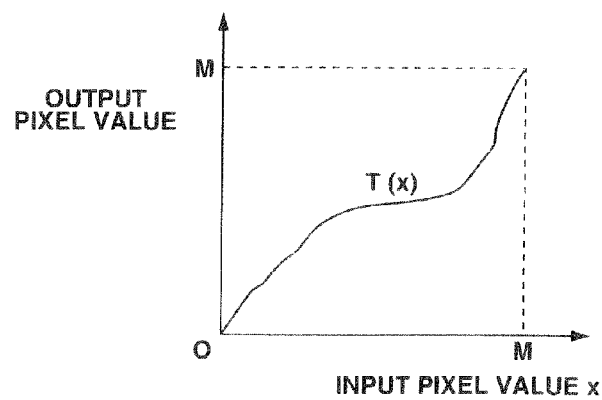
FIG. 5 is a graph showing an example of a tone curve calculated by the histogram calculating section according to the embodiment 1.
Figure 6:
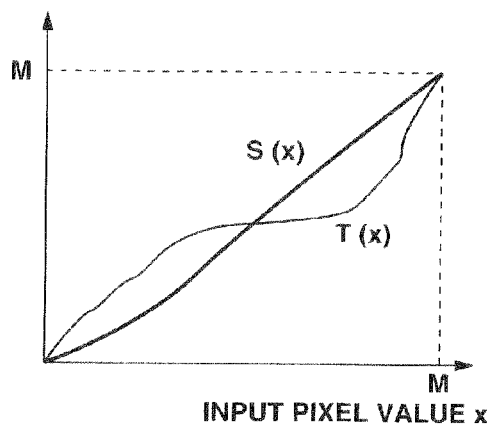
FIG. 6 is a graph showing a tone curve $T(x)$ calculated by the histogram calculating section according to the embodiment 1 and a tone curve $S(x)$ that makes a false contour less prominent stored in a tone curve determining section.
Figure 7:
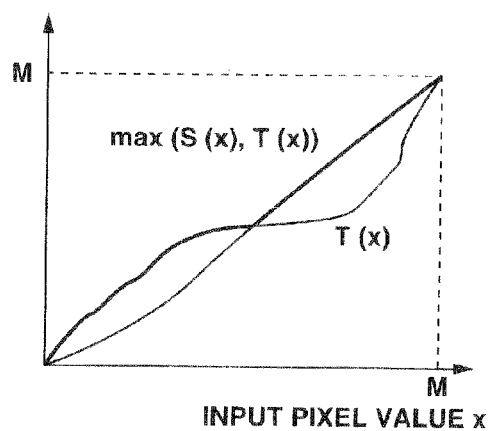
FIG. 7 is a graph showing a tone curve $\max(S(x), T(x))$, which assumes the greater of the values of the tone curve $T(x)$ and the tone curve $S(x)$ for each input pixel value, calculated by the tone curve determining section according to the embodiment 1.
Figure 8:
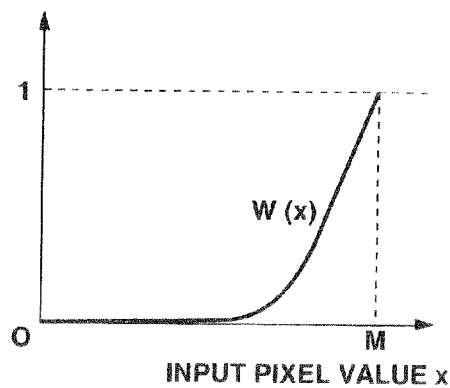
FIG. 8 is a graph showing a weight $W(x)$ used by the tone curve determining section according to the embodiment 1 for mixing the tone curve $\max(S(x), T(x))$ and the tone curve $T(x)$.
Figure 9:
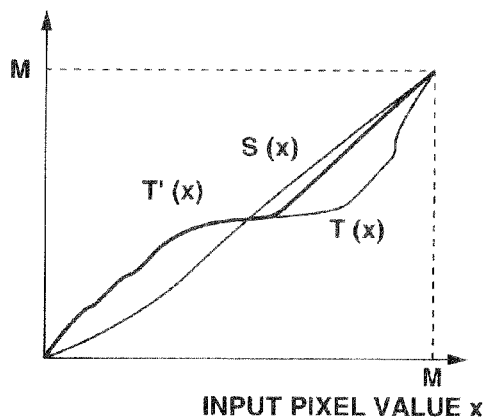
FIG. 9 is a graph showing a tone curve $T'(x)$ calculated by the tone curve determining section according to the embodiment 1 weighing the tone curve $\max(S(x), T(x))$ and the tone curve $T(x)$ with the weight $W(x)$.
Figure 10:
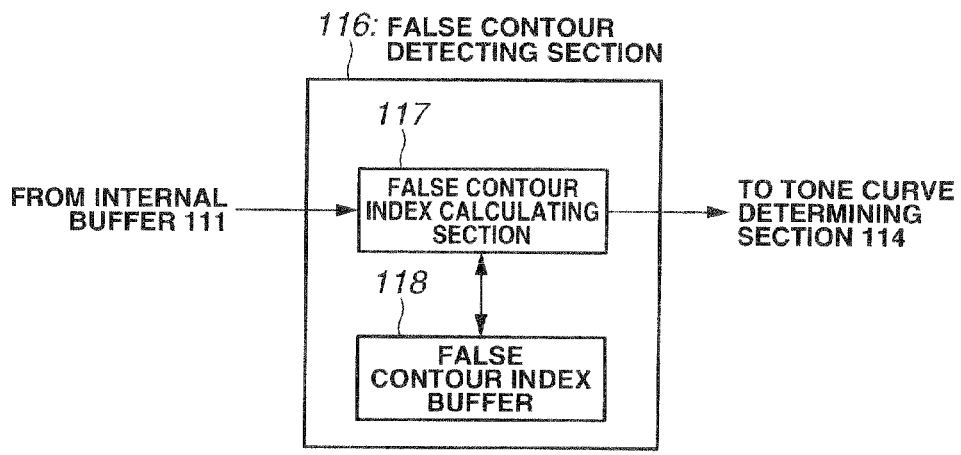
FIG. 10 is a block diagram showing a configuration of a first modification of a false contour detecting section according to the embodiment 1.
Figure 11:
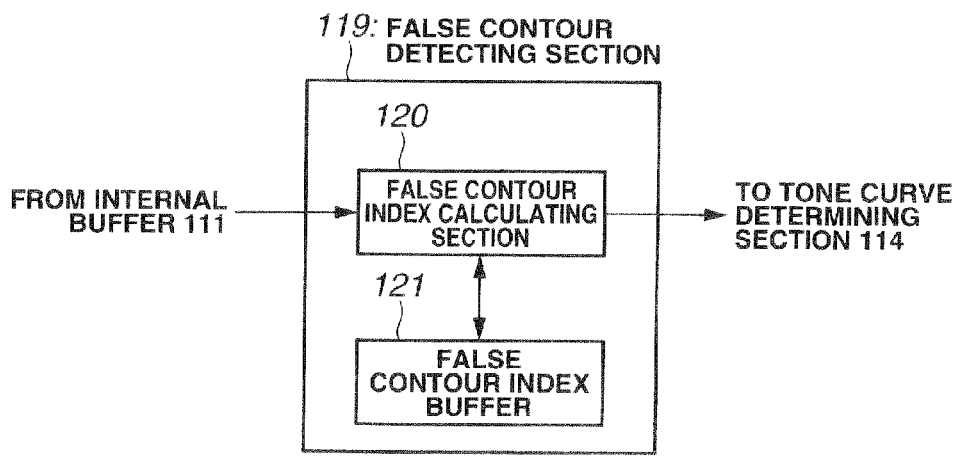
FIG. 11 is a block diagram showing a configuration of a second modification of the false contour detecting section according to the embodiment 1.
Figure 12:
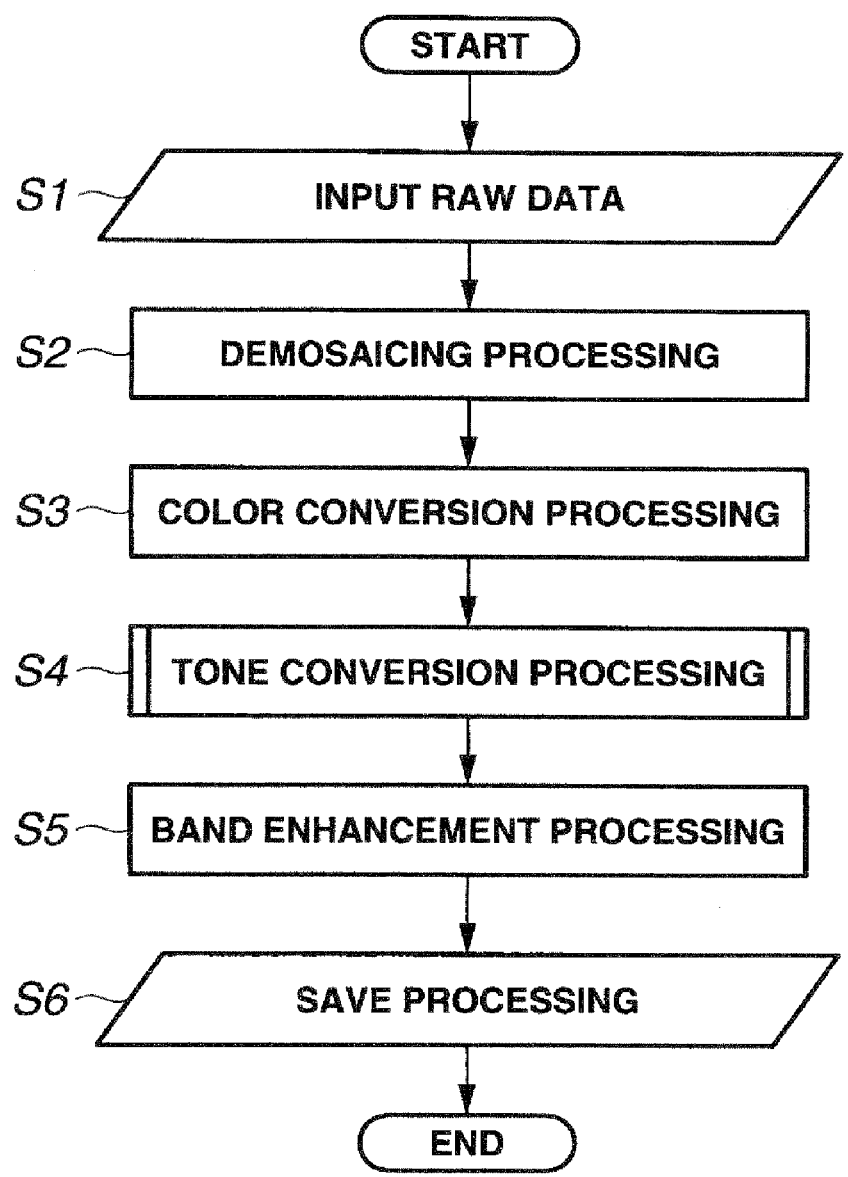
FIG. 12 is a flow chart showing a flow of the whole of a processing by an image processing program according to the embodiment 1.
Figure 13:
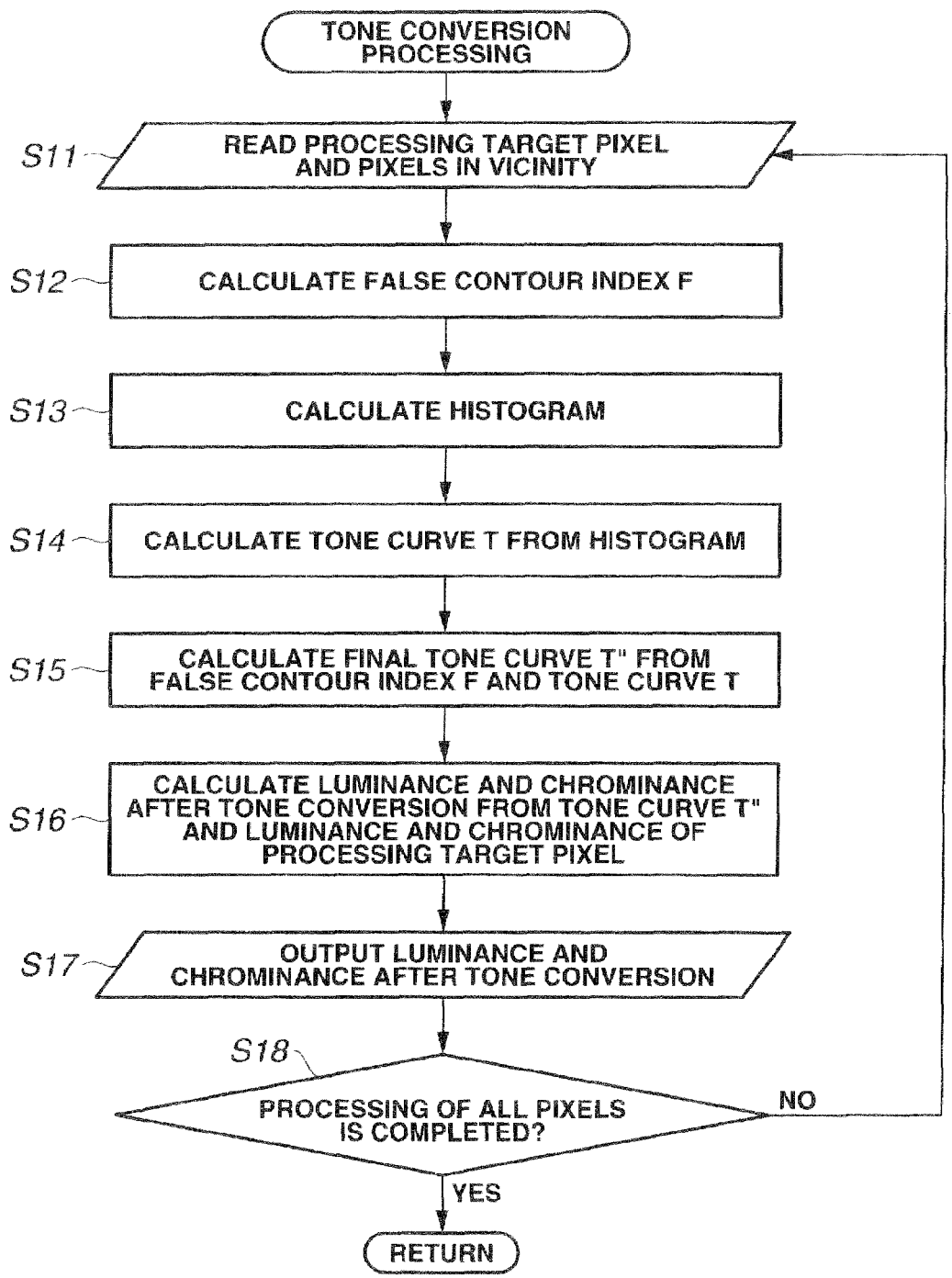
FIG. 13 is a flow chart showing a tone conversion processing in step S4 in FIG. 12 according to the embodiment 1 in detail.

FIGS. 1 to 13 illustrate an embodiment 1 of the present invention. FIG. 1 is a block diagram showing a configuration of an image processing apparatus, FIG. 2 is a block diagram showing a configuration of a tone converting section, FIG. 3 shows a vicinity of a processing target pixel used by the tone converting section for false contour detection and histogram calculation, FIG. 4 is a graph showing an example of a histogram calculated by a histogram calculating section, FIG. 5 is a graph showing an example of a tone curve calculated by the histogram calculating section, FIG. 6 is a graph showing a tone curve T(x) calculated by the histogram calculating section and a tone curve S(x) that makes a false contour less prominent stored in a tone curve determining section, FIG. 7 is a graph showing a tone curve max(S(x), T(x)), which assumes the greater of the values of the tone curve T(x) and the tone curve S(x) for each input pixel value, calculated by the tone curve determining section, FIG. 8 is a graph showing a weight W(x) used by the tone curve determining section for mixing the tone curve max(S(x), T(x)) and the tone curve T(x), FIG. 9 is a graph showing a tone curve T'(x) calculated by the tone curve determining section weighing the tone curve max(S(x), T(x)) and the tone curve T(x) with the weight W(x), FIG. 10 is a block diagram showing a configuration of a first modification of a false contour detecting section, FIG. 11 is a block diagram showing a configuration of a second modification of the false contour detecting section, FIG. 12 is a flow chart showing a flow of the whole of a processing by an image processing program, and FIG. 13 is a flow chart showing a tone conversion processing in step S4 in FIG. 12 in detail.

In the following description, the term "color image" is used to mean both a color static image and a color dynamic image.

As shown in FIG. 1, an image processing apparatus according to the present embodiment includes an image pickup section 00 and a processor 101.

Although not shown, the image pickup section 100 includes an image pickup optical system that forms an optical image of a subject, a single panel CCD that photoelectrically converts the optical image formed by the image pickup optical system into an electrical analog signal and outputs the electrical analog signal, an A/D converting section that converts the analog signal output from the single panel CCD into a digital signal, and an illumination system that illuminates the subject with illumination light.

The processor 101 includes a demosaicing section 102, a color converting section 103, a tone converting section 104, a band enhancing section 105, a recording section 106 and a controlling section 107. The image pickup section 100 is connected to the demosaicing section 102. In the processor 101, the demosaicing section 102 is connected to the color converting section 103, the color converting section 103 is connected to the tone converting section 104, the tone converting section 104 is connected to the band enhancing section 105, and the band enhancing section 105 is connected to the recording section 106. The controlling section 107 is bidirectionally connected to the demosaicing section 102, the color converting section 103, the tone converting section 104, the band enhancing section 105 and the recording section 106 to control those sections. Furthermore, the controlling section 107 is bidirectionally connected to the image pickup section 100 to control the image pickup section 100.

As shown in FIG. 2, the tone converting section 104 includes an internal buffer 111, a false contour detecting section 112 (false contour detecting means), a histogram calculating section 113 (tone correcting means), a tone curve determining section 114 (tone correcting means, controlling means), and a tone curve applying section 115 (tone correcting means). The color converting section 103 is connected to the internal buffer 111. The internal buffer 111 is connected to the false contour detecting section 112 and the histogram calculating section 113. The false contour detecting section 112 and the histogram calculating section 113 are connected to the tone curve determining section 114. The tone curve determining section 114 and the internal buffer 111 are connected to the tone curve applying section 115. The tone curve applying section 115 is connected to the band enhancing section 105.

Next, operation of the image processing apparatus according to the present embodiment will be described.

When the image pickup section 100 takes an image under the control of the controlling section 107, image signals produced by the single panel CCD are A/D-converted and then inputted to the demosaicing section 102 in the processor 101.

The demosaicing section 102 complements each pixel in the image signals with a missing color component (for example, an R pixel position lacks the G and B color components, an G pixel position lacks the R and B color components, and a B pixel position lacks the R and G color components) by a known interpolation processing and sequentially outputs the resulting signals to the color converting section 103.

The color converting section 103 converts the signals inputted from the demosaicing section 102 into signals representing a luminance Y and chrominances Cr and Cb on a pixel basis and sequentially outputs the resulting signals to the tone converting section 104.

The tone converting section 104 performs tone conversion on the signals inputted from the color converting section 103 on a pixel basis and outputs the result of the processing to the band enhancing section 105. However, in order to perform the tone conversion on one pixel, pixel data of a predetermined size for a vicinity of the pixel is required, so that the input signals from the color converting section 103 are first stored in the internal buffer 111. Then, after data required to perform the processing of the target pixel is accumulated in the internal buffer 111, the tone conversion processing is performed, and the results of the conversion are sequentially output to the band enhancing section 105. Then, the tone converting section 104 chooses another pixel as a next processing target pixel and processes the pixel in the same way as described above.

The band enhancing section 105 performs a known band enhancement processing on the inputted tone-converted data and outputs the result of the processing to the recording section 106.

The recording section 106 records the band-enhanced data in a recording medium in a predetermined format.

When the recording section 106 completes the processing for all the signals inputted to the processor 101 from the image pickup section 100, the controlling section 107 enters a standby state for a next image pickup.

Next, operation of the tone converting section 104 shown in FIG. 2 will be described in more detail.

When data required for the tone converting section 104 to perform the processing (that is, data for a vicinity of the processing target pixel, the term "vicinity" used in the present embodiment meaning a vicinity of the processing target pixel including the processing target pixel itself) is accumulated in the internal buffer 111, the false contour detecting section 112 detects whether or not a false contour occurs in the vicinity of the processing target pixel. If the data that the false contour detecting section 112 reads from the internal buffer 111 as data required for the processing is data for a vicinity of a processing target pixel Pc shown in FIG. 3, for example, false contour occurrence detection is performed as described below.

First, for each pixel P1, P2, . . . , Pn (n represents the number of pixels in the vicinity) in the vicinity of the processing target pixel Pc, the luminance and the chrominance are converted into R, G and B values, and each of the resulting R, G and B values is compared with a predetermined threshold. If the value is equal to or greater than the predetermined threshold, it is determined that the color component is saturated, or if the value is smaller than the predetermined threshold, it is determined that the color component is not saturated. Then, the pixels for which the number of saturated color components is 1 or 2 are counted. Finally, the count is divided by the number n of pixels in the vicinity to calculate a false contour index F, which indicates the degree of false contour occurrence, and outputs the false contour index F to the tone curve determining section 114.

In parallel with the operation of the false contour detecting section 112 described above, the histogram calculating section 113 creates a luminance histogram for the pixels in the vicinity as shown in FIG. 4 and further creates a cumulative histogram to scale a cumulative value to be equal to an input maximum pixel value M, thereby creating a tone curve T(x) that converts an input pixel value into an output pixel value as shown in FIG. 5 (where x represents an input pixel value). The histogram calculating section 113 outputs the created tone curve T(x) to the tone curve determining section 114. The tone curve T(x) calculated by the histogram calculating section 113 has tone conversion characteristics for performing a so-called histogram equalization on the processing target pixel PC.

Based on the tone curve inputted from the histogram calculating section 113 and the false contour index F inputted from the false contour detecting section 112, the tone curve determining section 114 determines a final tone curve as described below.

First, the tone curve determining section 114 previously stores a tone curve S(x) set to prevent a false contour from being prominent. The tone curve S(x) set to prevent a false contour from being prominent refers to a tone curve set to provide a moderate tone variation in a bright area.

The tone curve determining section 114 first calculates a new tone curve T'(x) based on the tone curve S(x) described above and the tone curve T(x) inputted from the histogram calculating section 113 according to the following Equation 1.

$$T'(x) = W(x) \times \max(S(x), T(x)) + (1 - W(x)) \times T(x) \quad \text{[Equation 1]}$$

In the equation, max(a, b) is a function that returns the value of a or b that is not smaller than the other, and W(x) is a weight that depends on the input pixel value x.

As shown in FIG. 8, the weight W(x) is close to 1 in an area for which the input pixel value x is large (or in other words, a bright area) and is approximately 0 in an area for which the input pixel value x is small (or in other words, a dark area).

The calculation of the Equation 1 is performed in the procedure described below. First, as shown in FIG. 7, a tone curve max(S(x), T(x)), which assumes a value of the tone curve S(x) or the tone curve T(x) that are not smaller than the value of the other (or equal to or greater than the value of the other) for each input pixel value x, is created. In the specific example shown in FIG. 7, the value of the tone curve S(x) is smaller than the value of the tone curve T(x) in a dark area and greater than the value of the tone curve T(x) in a bright area. Thus, the tone curve max(S(x), T(x)) is composed of a part of the tone curve T(x) in the dark area and a part of the tone curve S(x) in the bright area that are combined at a point of intermediate brightness. Both the tone curves S(x) and T(x) are curves that return the same value M in response to the input maximum pixel value M, and the tone curve S(x) is a curve that is set to moderately vary in the vicinity of the input maximum value M, or in other words, in response to an input value corresponding to a bright area. Therefore, if the tone curve T(x) is a curve that abruptly varies in the vicinity of the input maximum pixel value M, the value of the tone curve T(x) is smaller than the value of the tone curve S(x) in the vicinity of the input maximum pixel value M. Therefore, the tone curve max(S(x), T(x)) is likely to more moderately vary in response to an input value corresponding to a bright area in the vicinity of the input maximum pixel value M than the tone curve T(x).

Then, the procedure of the calculation of the Equation 1 proceeds to the step described below. That is, the tone curve max(S(x), T(x)) shown in FIG. 7 is multiplied by the weight W(x), the tone curve T(x) is multiplied by a weight (1−W(x)), and the products are summed to calculate a tone curve T'(x) shown in FIG. 9. The tone curve T'(x) shown in FIG. 9 calculated in this way strongly reflects the effect of the tone curve T(x) for planarizing the histogram in a low luminance area (dark area) and a medium luminance area and more moderately varies than the tone curve T(x) in a high luminance area (bright area).

Furthermore, the tone curve determining section 114 calculates a final tone curve T"(x) by using the false contour index F according to the following Equation 2.

$$T''(x) = F \times T'(x) + (1 - F) \times T(x) \quad \text{[Equation 2]}$$

The tone curve T"(x) calculated according to the Equation 2 has a shape close to the shape of the tone curve T'(x) if the probability that a false contour occurs in the vicinity is high (the false contour index F is close to 1) or has a shape close to the tone curve T(x) if the probability is low (the false contour index F is close to 0).

Then, the tone curve determining section 114 outputs the calculated tone curve T"(x) to the tone curve applying section 115.

Based on the tone curve T"(x) inputted from the tone curve determining section 114 and a luminance Y_c and chrominances Cr_c and Cb_c of the processing target pixel Pc read from the internal buffer 111, the tone curve applying section 115 calculates a luminance Y_c" and chrominances Cr_c" and Cb_c", which are final outputs from the tone converting section 104, according to the following Equation 3 and outputs the results of the calculation to the band enhancing section 105.

$$Y\_c'' = T''(Y\_c)$$

$$Cr\_c'' = Cr\_c \times Y\_c''/Y\_c$$

$$Cb\_c'' = Cb\_c \times Y\_c''/Y\_c \quad \text{[Equation 3]}$$

Not that the configuration and operation of the present embodiment are not limited to those described above, and various modifications are possible.

For example, in the above description, the tone curve applying section 115 performs the tone conversion on the luminance Y_c and the chrominances Cr_c and Cb_c of the processing target pixel Pc according to the Equation 3. Alternatively, however, the values Y_c, Cr_c and Cb_c may be converted into R, G and B values, each of the R, G and B values may be subjected to tone conversion according to the tone curve T''' and then converted back into a luminance value and chrominance values, and the resulting luminance value and chrominance values may be output to the band enhancing section 105.

Furthermore, in the above description, it is assumed that the image pickup section 100 outputs a color static image. However, the image pickup section 100 may output a color dynamic image. In that case, the processor 101 can perform the processings described above on each field or frame of the signals outputted from the image pickup section 100.

In the case where the processor 101 processes signals of a color dynamic image, furthermore, it is preferred that the tone conversion characteristics do not abruptly vary with frame or field. Such a modification (first modification) will be described with reference to FIG. 10. In the following, a case will be described where a dynamic image is composed of a plurality of frames, for example. However, the same description holds true for a case where a dynamic image is composed of a plurality of fields.

In the first modification, the false contour detecting section 112 shown in FIG. 2 is replaced with a false contour detecting section 116 (false contour detecting means) shown in FIG. 10. The false contour detecting section 116 includes a false contour index calculating section 117 and a false contour index buffer 118, as shown in FIG. 10.

The false contour index buffer 118 can store the same number of pixels of data as the frame inputted to the processor 101. The false contour index buffer 118 stores the false contour index of each pixel calculated by the false contour index calculating section 117 for the frame preceding the current frame.

The false contour index calculating section 117 first reads pixels in a vicinity including the current processing target pixel in the current frame from the internal buffer 111 and performs the same calculation as that performed by the false contour detecting section 112 described above on the read processing target pixel, thereby determining the false contour index F. Then, the false contour index calculating section 117 reads a false contour index F' for a pixel in the preceding frame that is located at the same position as the current processing target pixel from the false contour index buffer 118. Then, the false contour index calculating section 117 calculates an average value F'''=(F+F')/2 of the false contour indexes F and F' and determines the calculated average value as a final false contour index F'''. Then, the false contour index calculating section 117 outputs the calculated false contour index F''' to the tone curve determining section 114 and updates the false contour index buffer 118 by writing the false contour index F''' in the false contour index buffer 118 at the same position as the processing target pixel.

By the processing described above, the false contour indexes are averaged (smoothed) among the frames, and a natural dynamic image in which the tone conversion characteristics temporally moderately vary can be provided.

In the first modification described above, the false contour index buffer 118 has to be a large capacity memory. However, the capacity of the memory is preferably reduced. From this point of view, a second modification shown in FIG. 11 and described below is devised.

As shown in FIG. 11, a false contour detecting section 119 (false contour detecting means) according to the second modification includes a false contour index calculating section 120 (false contour detecting means) and a false contour index buffer 121 and appears to be substantially the same as the false contour detecting section in the first modification shown in FIG. 10 as far as the false contour index calculating section is shown in a block diagram. However, the false contour index buffer 121 does not store the false contour index for each pixel in the preceding frame but stores a single false contour index F'all that indicates the frequency of false contour occurrence for the entire preceding frame.

In addition, the false contour index calculating section 120 does not calculate the false contour index for each processing target pixel in the current frame but outputs the false contour index F'all read from the false contour index buffer 121 as a substitute value to the tone curve determining section 114. In parallel with the operation, the false contour index calculating section 120 converts the luminance and chrominance of the processing target pixel into R, G and B signals and determines whether or not each color component is saturated. If the number of saturated color components is 1 or 2, the false contour index calculating section 120 increments an internal counter C by 1. The counter C is initialized to 0 before processing of the current frame is started.

Once the processing of all the processing target pixels in the current frame by the false contour index calculating section 120 is completed, the false contour index calculating section 120 calculates a false contour index Fall that indicates the frequency of false contour occurrence for the frame that has been processed according to an equation Fall={C/(number of pixels in frame)} and determines an average value (F'all+Fall)/2 of the false contour index Fall and the false contour index F'all that indicates the frequency of false contour occurrence in the preceding frame as a new value of the false contour index F'all stored in the false contour index buffer 121. Thus, even an extremely low capacity memory suffice for prevention of a prominent false contour in a scene that tends to cause a false contour and allows provision of a natural dynamic image in which the tone conversion characteristics temporally moderately vary.

Although it is assumed that the processing is implemented with hardware in the above description, the present invention is not limited thereto, and the processing may be implemented with software.

With reference to FIG. 12, a flow of the whole of the processing by an image processing program will be described. The image processing program shown in FIG. 12 is a program recorded on a recording medium and designed to perform development of RAW data outputted from the image pickup section 100 described above (The term "RAW data" used herein refers to a signal from the single panel CCD that has been A/D-converted. The RAW data is inputted to a computer or the like that executes the image processing program via a recording medium or through a communication line and subjected to a processing, such as the processing described below).

At the beginning of the processing, the RAW data is inputted (step S1).

Then, a processing for complementing a pixel with a missing color component is performed for all the pixels in the RAW data, thereby producing an image in which all the pixels have all kinds of color components (step S2). The processing for complementing a pixel with a missing color component is the same as the processing performed by the demosaicing section 102 shown in FIG. 1.

Then, color conversion is performed for all the pixels resulting from the processing in step S2, thereby producing an image in which each pixel is composed of a luminance Y and chrominances Cr and Cb (step S3). The processing of color conversion is the same as the processing performed by the color converting section 103 shown in FIG. 1.

Then, a tone conversion processing is performed for all the pixels resulting from the processing in step S3, thereby producing a tone-converted image (step S4). The tone conversion processing is the same as the processing performed by the tone converting section 104 shown in FIG. 1.

Then, a band enhancement processing is performed for all the pixels resulting from the processing in step S4, thereby producing a band-enhanced image (step S5). The band enhancement processing is the same as the processing performed by the band enhancing section 105 shown in FIG. 1.

Finally, the image resulting from the processing in step S5 is saved in a recording medium, such as a hard disk drive (HDD), in a specified format (step S6), and the processing ends.

Next, with reference to FIG. 13, the tone conversion processing in step S4 in FIG. 12 will be described in more detail.

At the beginning of the processing, a processing target pixel to be subjected to the tone conversion is read from a color-converted image sequentially. Furthermore, pixels in a vicinity of a predetermined size that are required for tone conversion of the processing target pixel are also read (step S11).

Then, from the pixels in the vicinity read in step S11, the false contour index F for the vicinity of the processing target pixel is calculated (step S12). The calculation processing is the same as the processing performed by the false contour detecting section 112 shown in FIG. 2.

Then, from the pixels in the vicinity read in step S11, a histogram for the vicinity of the processing target pixel is calculated (step S13).

Then, based on the histogram calculated in step S13, the tone curve T used for histogram equalization for the vicinity of the processing target pixel is calculated (step S14). The processings in steps S13 and S14 are the same as the processings performed by the histogram calculating section 113 shown in FIG. 2.

Then, based on the tone curve T calculated in step S14 and the false contour index F calculated in step S12, the final tone curve T" is calculated (step S15). The calculation processing is the same as the processing performed by the tone curve determining section 114 shown in FIG. 2.

Then, the tone curve calculated in step S15 is applied to the luminance of the processing target pixel to calculate the luminance after tone conversion. The processing concerning the luminance is the same as the processing performed by the tone curve applying section 115 shown in FIG. 2. Furthermore, the chrominance of the processing target pixel is scaled depending on the luminance variation due to tone conversion, thereby calculating the chrominance after tone conversion. The processing concerning the chrominance is the same as the processing performed by the tone curve applying section 115 shown in FIG. 2 (step S16).

Then, the luminance and chrominance after tone conversion calculated in step S16 are outputted (step S17).

Then, it is determined whether or not there remains a pixel yet to be processed (step S18). If there remains a pixel yet to be processed, the process returns to step S11, and the procedure described above is repeated. Otherwise, the process ends.

According to the embodiment 1 described above, since the space-variant tone conversion is performed, an image close to the image perceived by human vision can be produced. In addition, since the controlling means corrects the tone correction characteristics of the tone correcting means to make a false contour less prominent according to the degree of false contour occurrence determined by the false contour detecting means, and the tone correcting means performs the tone correction by using the corrected tone correction characteristics, a false contour is made less prominent in a scene in which the false contour occurs.

In addition, since the tone conversion characteristics of the highlight are set to be moderate in the case where the degree of false contour occurrence is high, the false contour surrounding the highlight can be made further less prominent.

In addition, since the degree of false contour occurrence is evaluated for each pixel, the quality of the image can be improved.

Meanwhile, if the degree of false contour occurrence is evaluated for the entire image, the processing can be simplified without significantly compromising the effect of making the false contour less prominent.

In addition, since the variation in tone conversion characteristics between frames of a dynamic image is suppressed, the quality of the dynamic image can be improved.

[Embodiment2]

Figure 14:
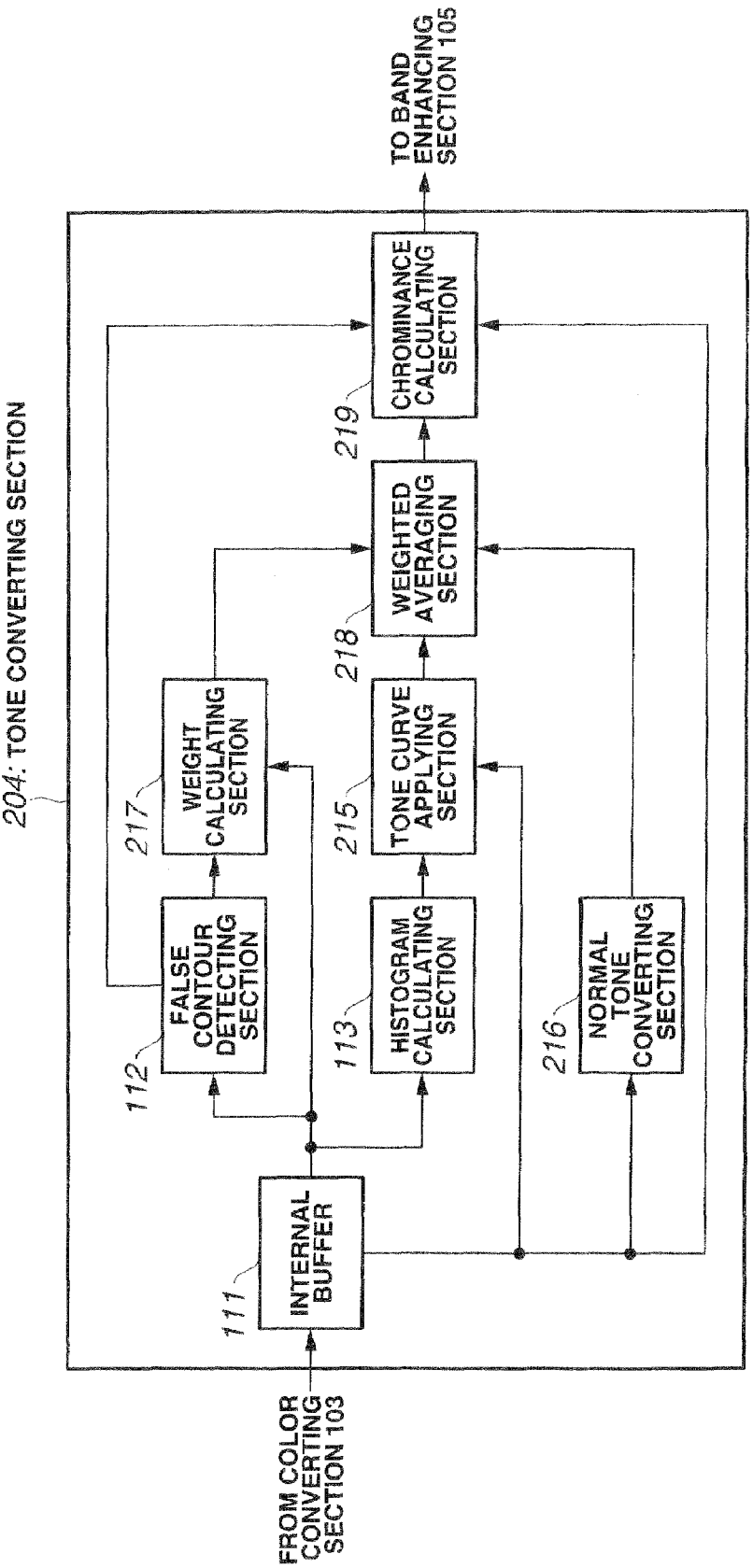
FIG. 14 is a block diagram showing a configuration of a tone converting section according to an embodiment 2 of the present invention.
Figure 15:
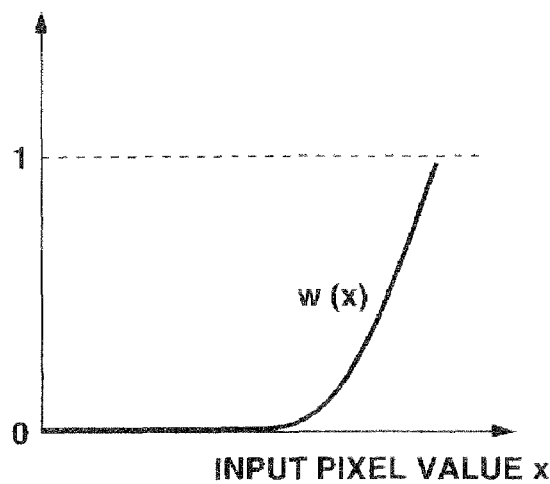
FIG. 15 is a graph showing a weight $w(x)$ used by a weight calculating section according to the embodiment 2.
Figure 16:
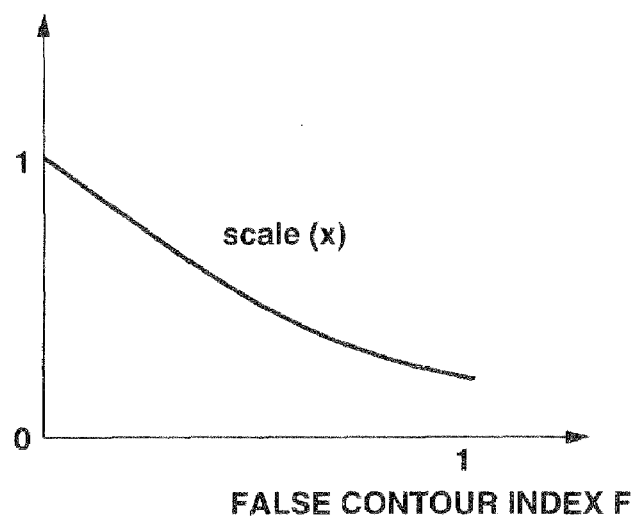
FIG. 16 is a graph showing a function $scale(x)$ used by a chrominance calculating section according to the embodiment 2.
Figure 17:
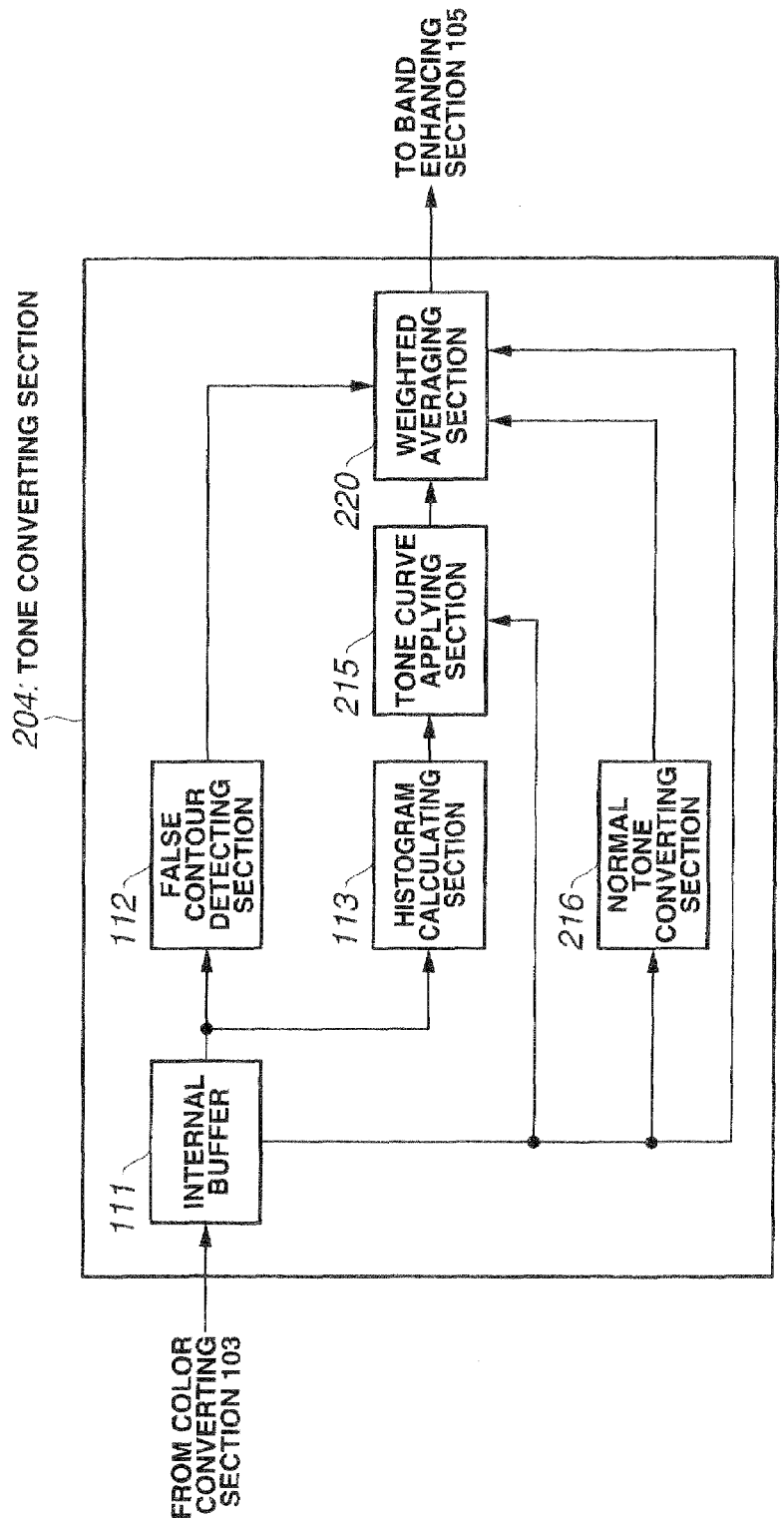
FIG. 17 is a block diagram showing a configuration of a modification of the tone converting section according to the embodiment 2.
Figure 18:
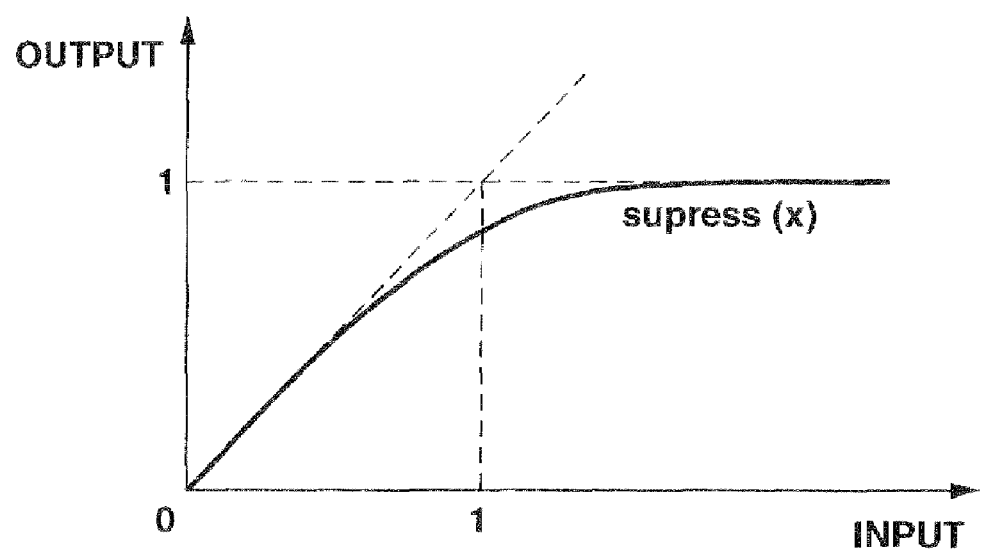
FIG. 18 is a graph showing a function $suppress(x)$ used by a weighted averaging section according to the embodiment 2.
Figure 19:
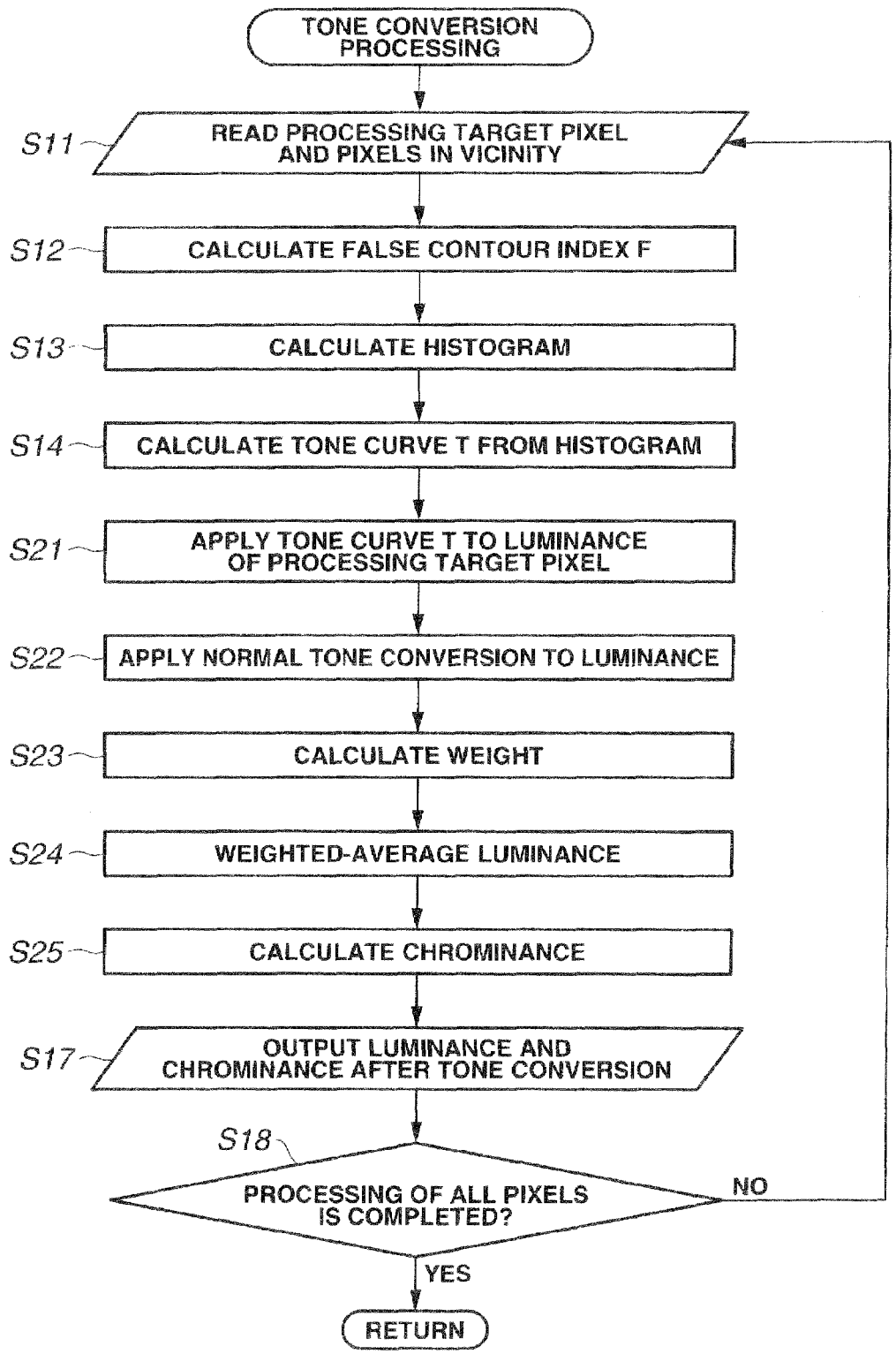
FIG. 19 is a flow chart showing a tone conversion processing according to the embodiment 2.

FIGS. 14 to 19 illustrate an embodiment 2 of the present invention. FIG. 14 is a block diagram showing a configuration of a tone converting section, FIG. 15 is a graph showing a weight w(x) used by a weight calculating section, FIG. 16 is a graph showing a function scale(x) used by a chrominance calculating section, FIG. 17 is a block diagram showing a configuration of a modification of the tone converting section, FIG. 18 is a graph showing a function suppress(x) used by a weighted averaging section, and FIG. 19 is a flow chart showing a tone conversion processing.

In the embodiment 2, the same parts as those in the embodiment 1 described above are denoted by the same reference numerals, and descriptions thereof will be omitted, and only differences from the embodiment 1 will be described.

An image processing apparatus according to the present embodiment has a tone converting section 204 shown in FIG. 14 instead of the tone converting section 104 according to the embodiment 1 described above shown in FIG. 1. The tone converting section 204 is connected to the other sections in the image processing apparatus in the same way as the tone converting section 104, and the other sections in the image processing apparatus and the operation of the whole of the image processing apparatus are the same as those of the image processing apparatus shown in FIG. 1.

With reference to FIG. 14, the tone converting section 204 will be described.

The tone converting section 204 includes an internal buffer 111, a false contour detecting section 112, a histogram calculating section 113, a tone curve applying section 215 (tone correcting means, temporary tone correcting means), a normal tone converting section 216 (means of performing a common tone conversion on an entire image, temporary tone correcting means), a weight calculating section 217 (controlling means), a weighted averaging section 218 (tone correcting means, controlling means, means of combining at a predetermined combination ratio), and a chrominance calculating section 219. The color converting section 103 is connected to the internal buffer 111. The internal buffer 111 is connected to the false contour detecting section 112, the histogram calculating section 113, the tone curve applying section 215, the weight calculating section 217, the normal tone converting section 216 and the chrominance calculating section 219. The false contour detecting section 112 is connected to the weight calculating section 217 and the chrominance calculating section 219. The histogram calculating section 113 is connected to the tone curve applying section 215. The tone curve applying section 215, the weight calculating section 217 and the normal tone converting section 216 are connected to the weighted averaging section 218. The weighted averaging section 218 is connected to the chrominance calculating section 219. The chrominance calculating section 219 is connected to the band enhancing section 105.

Next, operation of the tone converting section 204 will be described.

As with the tone converting section 104 according to the embodiment 1 described above, the tone converting section 204 performs a tone conversion processing on each pixel by accumulating the pixels outputted from the color converting section 103 in the internal buffer 111. The pixels in the vicinity required for processing each pixel are the same as those according to the embodiment 1 described above shown in FIG. 3.

When the pixels in the vicinity required for the tone conversion processing of the processing target pixel are accumulated in the internal buffer 111, the false contour detecting section 112 detects whether or not a false contour occurs in the vicinity of the processing target pixel. In addition, the false contour detecting section 112 calculates the false contour index F that indicates the degree of false contour occurrence as in the embodiment 1 described above and outputs the calculated false contour index F to the weight calculating section 217 and the chrominance calculating section 219.

When the false contour index F is inputted to the weight calculating section 217 from the false contour detecting section 112, the weight calculating section 217 calculates the weight W used for weighted averaging by the weighted averaging section 218 by using the false contour index F and the luminance $Y\_c$ of the processing target pixel according to the following Equation 4 and outputs the calculated weight W to the weighted averaging section 218.

$$W = F \times w(Y\_c) \quad \text{[Equation 4]}$$

In the equation, the weight function $w(x)$ is a function that increases with the input pixel value x (or in other words, increases as the pixel becomes brighter) as shown in FIG. 15.

In parallel with the operation described above, the histogram calculating section 113 creates a cumulative luminance histogram for the pixels in the vicinity and calculates a tone curve (tone conversion characteristics) $T(x)$ for performing histogram equalization on the processing target pixel Pc in the same manner as in the embodiment 1 described above. Then, the histogram calculating section 113 outputs the calculated tone curve $T(x)$ to the tone curve applying section 215.

Based on the tone curve $T(x)$ inputted from the histogram calculating section 113 and the luminance $Y\_c$ of the processing target pixel Pc read from the internal buffer 111, the tone curve applying section 215 calculates a luminance $Y\_c'$ after application of the tone curve according to the following Equation 5 and outputs the calculated luminance $Y\_c'$ to the weighted averaging section 218.

$$Y\_c' = T(Y\_c) \quad \text{[Equation 5]}$$

The calculation of the Equation 5 is the same as the calculation of the luminance by the tone curve applying section 115 in the embodiment 1 described above except that the tone curve differs from the tone curve used in the embodiment 1.

On the other hand, the normal tone converting section 216 previously stores a tone curve $U(x)$ set to make a false contour less prominent. The tone curve $U(x)$ set to make a false contour les prominent refers to a tone curve set to provide a moderate tone variation in a bright area. A specific example of the tone curve $U(x)$ is a tone curve $V1(x)$ shown in FIG. 21 in an embodiment 3 described later.

In parallel with the processing described above, the normal tone converting section 216 performs a tone conversion of the luminance $Y\_c$ of the processing target pixel Pc read from the internal buffer 111 according to the tone curve $U(x)$ as shown by the following Equation 6.

$$Y\_c''' = U(Y\_c) \quad \text{[Equation 6]}$$

The calculation of the Equation 6 is the same as the calculation performed by the tone curve applying section 215 except that the tone curve differs from the tone curve used by the tone curve applying section 215. Then, the normal tone converting section 216 outputs the calculated luminance $Y\_c'''$ to the weighted averaging section 218.

Using the weight W inputted from the weight calculating section 217, the luminance $Y\_c'$ inputted from the tone curve applying section 215 and the luminance $Y\_c'''$ inputted from the normal tone converting section 216, the weighted averaging section 218 calculates the luminance $Y\_c''$, which is a final result of tone conversion, according to the following Equation 7 and outputs the calculated luminance $Y\_c''$ to the chrominance calculating section 219.

$$Y\_c'' = (1-W) \times Y\_c' + W \times Y\_c''' \quad \text{[Equation 7]}$$

Using the luminance $Y\_c''$ after tone conversion inputted from the weighted averaging section 218, the false contour index F inputted from the false contour detecting section 112 and the original luminance $Y\_c$ and chrominances $Cr\_c$ and $Cb\_c$ of the processing target pixel read from the internal buffer 111, the chrominance calculating section 219 calculates the final chrominances $Cr\_c''$ and $Cb\_c''$ according to the following Equation 8.

$$Cr\_c'' = s \times Cr\_c$$

$$Cb\_c'' = s \times Cb\_c$$

$$s = \text{scale}(F) \times Y\_c''/Y\_c \quad \text{[Equation 8]}$$

The function $\text{scale}(x)$ in the Equation 8 is a function that equals to 1 when the false contour index F equals to 0 and monotonically decreases as the false contour index F increases as show in FIG. 16.

Then, the chrominance calculating section 219 outputs the calculated chrominances $Cr\_c''$ and $Cb\_c''$ and the luminance $Y\_c''$ transferred from the weighted averaging section 218 to the band enhancing section 105.

Owing to the processing described above, in the case where the false contour detecting section 112 determines that many false contours occur a tone conversion to make a false contour less prominent is performed using the tone curve U, or in the case where the false contour detecting section 112 determines that less false contours occur, a space-variant tone conversion is performed, and the chrominance is adjusted based on the false contour index (that is, the chromaticness is suppressed as shown by the Equation 8 according to the degree of false contour occurrence in the case where a false contour occurs). Thus, an image a false contour in which is made less prominent and the tone of which is converted to be close to the tone perceived by human vision can be produced.

The present embodiment can also be modified in various ways. A modification of the present embodiment will be described with reference to FIG. 17.

The tone converting section 204 in the modification shown in FIG. 17 includes the internal buffer 111, the false contour detecting section 112, the histogram calculating section 113, the tone curve applying section 215, the normal tone converting section 216, and a weighted averaging section 220 (tone correcting means, false contour detecting means, controlling means, means of combining at a predetermined combination ratio, primary tone correcting means). The internal buffer 111 is connected to the false contour detecting section 112, the histogram calculating section 113, the tone curve applying section 215, the normal tone converting section 216 and the weighted averaging section 220. The false contour detecting section 112 is connected to the weighted averaging section 220. The false contour detecting section 112 is connected to the weighted averaging section 220. The histogram calculating section 113 is connected to the weighted averaging section 220 via the tone curve applying section 215. The normal tone converting section 216 is connected to the weighted averaging section 220. The weighted averaging section 220 is connected to the band enhancing section 105.

The weighted averaging section 220 in the present modification combines the functions of the weight calculating section 217, the weighted averaging section 218 and the chrominance calculating sections 219 shown in FIG. 14. That is, the weighted averaging section 220 performs the processing described below to control the tone and chromaticness so that the false contour is not prominent in the image resulting from tone conversion.

First, based on the luminance $Y\_c''$ inputted from the normal tone converting section 216 and the pixel values $Y\_c$, $Cr\_c$ and $Cb\_c$ of the processing target pixel Pc read from the internal buffer 111, the weighted averaging section 220 calculates the chrominances $Cr\_c'''$ and $Cb\_c'''$ and a chromaticness $S'''$ after normal tone conversion according to the following Equation 9.

$$Cr\_c'''=Cr\_c \times Y\_c'''/Y\_c$$

$$Cb\_c'''=Cb\_c \times Y\_c'''/Y\_c$$

$$S'''=sqrt(Cr\_c'''^2+Cb\_c'''^2) \quad \text{[Equation 9]}$$

In the equation, the symbol sqrt means a square root. The symbol used in the following description means the same thing.

Furthermore, based on the luminance $Y\_c'$ inputted from the tone curve applying section 215 and the pixel values $Y\_c$, $Cr\_c$ and $Cb\_c$ of the processing target pixel Pc read from the internal buffer 111, the weighted averaging section 220 calculates the chrominances $Cr\_c'$ and $Cb\_c'$ and a chromaticness $S'$ after histogram equalization according to the following Equation 10.

$$Cr\_c'=Cr\_c \times Y\_c'/Y\_c$$

$$Cb\_c'=Cb\_c \times Y\_c'/Y\_c$$

$$S'=sqrt(Cr\_c'^2+Cb\_c'^2) \quad \text{[Equation 10]}$$

Then, a second false contour index F', which indicates the degree of false contour prominence, is calculated from the chromaticness S' and the false contour index F according to the following Equation 11.

$$F'=F \times supress(S'/S_0) \quad \text{[Equation 11]}$$

In the equation, $S_0$ is a critical chromaticness at which the false contour is not prominent even when a signal for which any one of the R, G and B signals is saturated is tone-converted and the value of $S_0$ is previously empirically set. The function supress(x) is a function that monotonically approaches to 1 as the value x increases beyond 1, and FIG. 18 shows an example of the function supress(x). The second false contour index F' thus calculated approaches to 1 as the false contour index F determined based on the degree of pixel value saturation increases and the chromaticness S' after histogram equalization increases beyond the critical chromaticness $S_0$ at which the false contour is not prominent.

Then, using the false contour index F', the weighted averaging section 220 calculates a chromaticness S" that is preferred as a final chromaticness after tone conversion based on the chromaticness S' after histogram equalization according to the following Equation 12.

$$S''=F' \times S_0+(1-F') \times S' \quad \text{[Equation 12]}$$

The chromaticness S" calculated according to the above Equation 12 approaches to $S_0$ when the second false contour index F' is close to 1 and approaches to S' when the second false contour index F' is close to 0. Therefore when the false contour index F determined based on the degree of pixel value saturation is large, and the chromaticness S' after histogram equalization is high, the chromaticness S" is close to $S_0$, and a false contour is made less prominent.

Then, the weighted averaging section 220 calculates a weight W to be used for calculating the final chromaticness S" by mixing the chromaticness S''' after normal tone conversion and the chromaticness S' after histogram equalization (more specifically, according to $S''=W \times S'''+(1-W) \times S'$) according to the following Equation 13.

$$W=(S''-S')/(S'''-S') \quad \text{[Equation 13]}$$

Finally the weighted averaging section 220 calculates the final luminance $Y\_c''$ and chrominances $Cr\_c''$ and $Cb\_c''$ after tone conversion by using the weight W according to the following Equation 14. [Equation 14]

$$Y\_c''=W \times Y\_c'''+(1-W) \times Y\_c'$$

$$Cr\_c''=W \times Cr\_c'''+(1-W) \times Cr\_c'$$

$$Cb\_c''=W \times Cb\_c'''+(1-W) \times Cb\_c' \quad \text{[Equation 14]}$$

As a result of the calculations, in an area in which the degree of pixel value saturation is high, the final chromaticness after tone conversion is suppressed to a level close to $S_0$, so that the false contour is less prominent, and the luminance tone conversion can be performed by appropriately reflecting the result of the histogram equalization in the result of the normal tone conversion.

Furthermore, in the present embodiment, the processing can also be implemented with software. The flow of the whole of the processing by the image processing program according to the present embodiment is essentially the same as the flow according to the embodiment 1 described above shown in FIG. 12. However, the tone conversion processing in step S4 in FIG. 12 is replaced with a tone conversion processing shown in FIG. 19. In the processing shown in FIG. 19, steps in which the same processings as those in the embodiment 1 described above shown in FIG. 13 are performed are denoted by the same reference numerals, and descriptions thereof will be omitted.

After the processing in step S14 is completed, the tone curve T calculated in step S14 is applied to the luminance $Y\_c$ of the processing target pixel according to the Equation 5 (step S21).

Then, the normal tone conversion is applied to the luminance $Y\_c$ of the processing target pixel according to the Equation 6 (step S22).

Then, a weight to be used for calculating the final result of luminance tone conversion is calculated according to the Equation 4 (step S23).

Then, using the weight calculated in step S23 and the luminances after tone conversion calculated in steps S21 and S22, the final result of luminance tone conversion is calculated according to the Equation 7 (step S24).

Then, the chrominance is corrected based on the luminance tone conversion result according to the Equation 8, and the corrected chrominance is designated as the final chrominance after tone conversion (step S25).

Following the processing in step S25, the processing in step S17 described above is performed.

According to the embodiment 2 described above, since the space-variant tone conversion is performed, an image close to the image perceived by human vision can be produced. In addition, since the controlling means corrects in a wider sense the tone correction characteristics of the tone correcting means to make a false contour less prominent according to the degree of false contour occurrence determined by the false contour detecting means, and the tone correcting means performs the tone correction by using the corrected tone correction characteristics in a wider sense, a false contour is made less prominent in a scene in which the false contour occurs.

In addition, even in the case where many false contours occur, since the combination ratio is controlled to bring the tone conversion characteristics for each pixel close to common tone conversion characteristics for all the pixels set to make the false contours less prominent, the false contours can be made less prominent.

In addition, since the degree of false contour occurrence is determined after temporary tone conversion, and the primary tone conversion is controlled according to the result of the determination, the tone can be controlled to make the false contours less prominent with higher reliability.

In addition, since the degree of false contour occurrence is evaluated for each pixel, the quality of the image can be improved.

In addition, in the case where a false contour occurs, the chrominance is adjusted depending on the degree of false contour occurrence, thereby suppressing the chromaticness, so that the false contour can be made less prominent.

[Embodiment 3]

Figure 20:
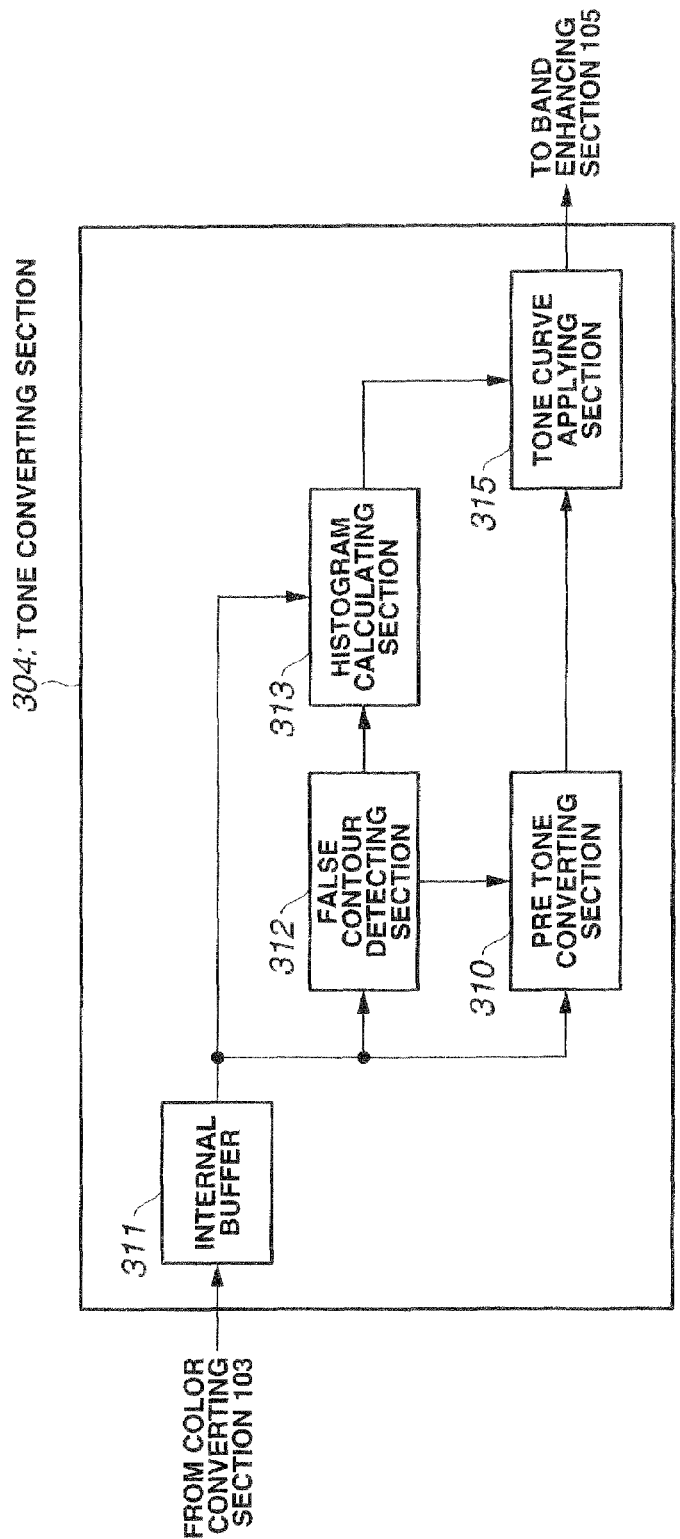
FIG. 20 is a block diagram showing a configuration of a tone converting section according to an embodiment 3 of the present invention.
Figure 21:
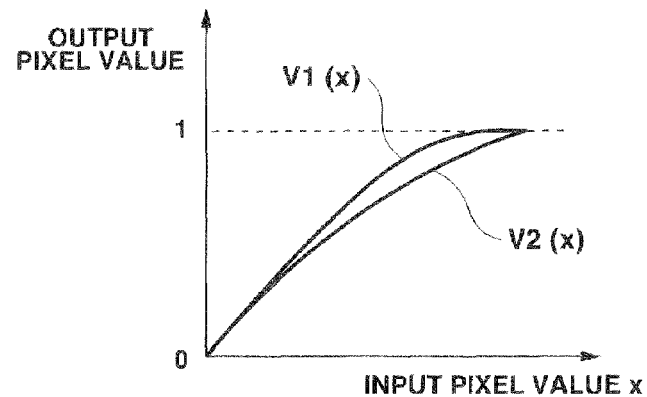
FIG. 21 is a graph showing tone conversion characteristics V1(x) and V2(x) used by a pre tone converting section according to the embodiment 3.
Figure 22:
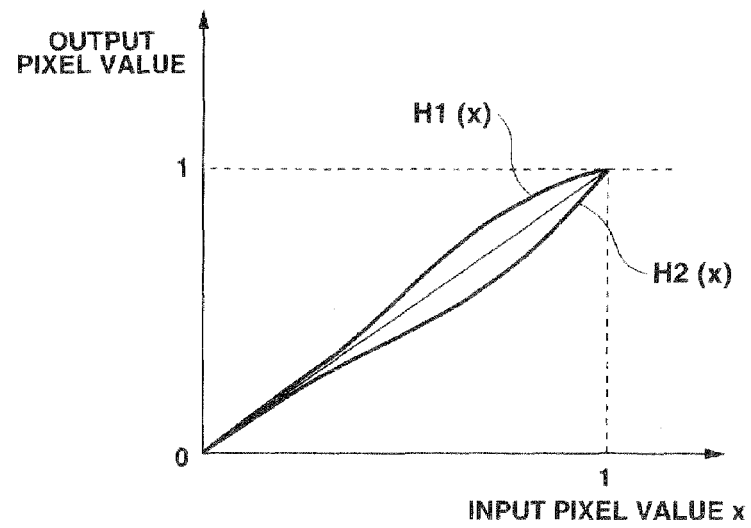
FIG. 22 is a graph showing tone conversion characteristics H1(x) and H2(x) used by a histogram calculating section according to the embodiment 3.
Figure 23:
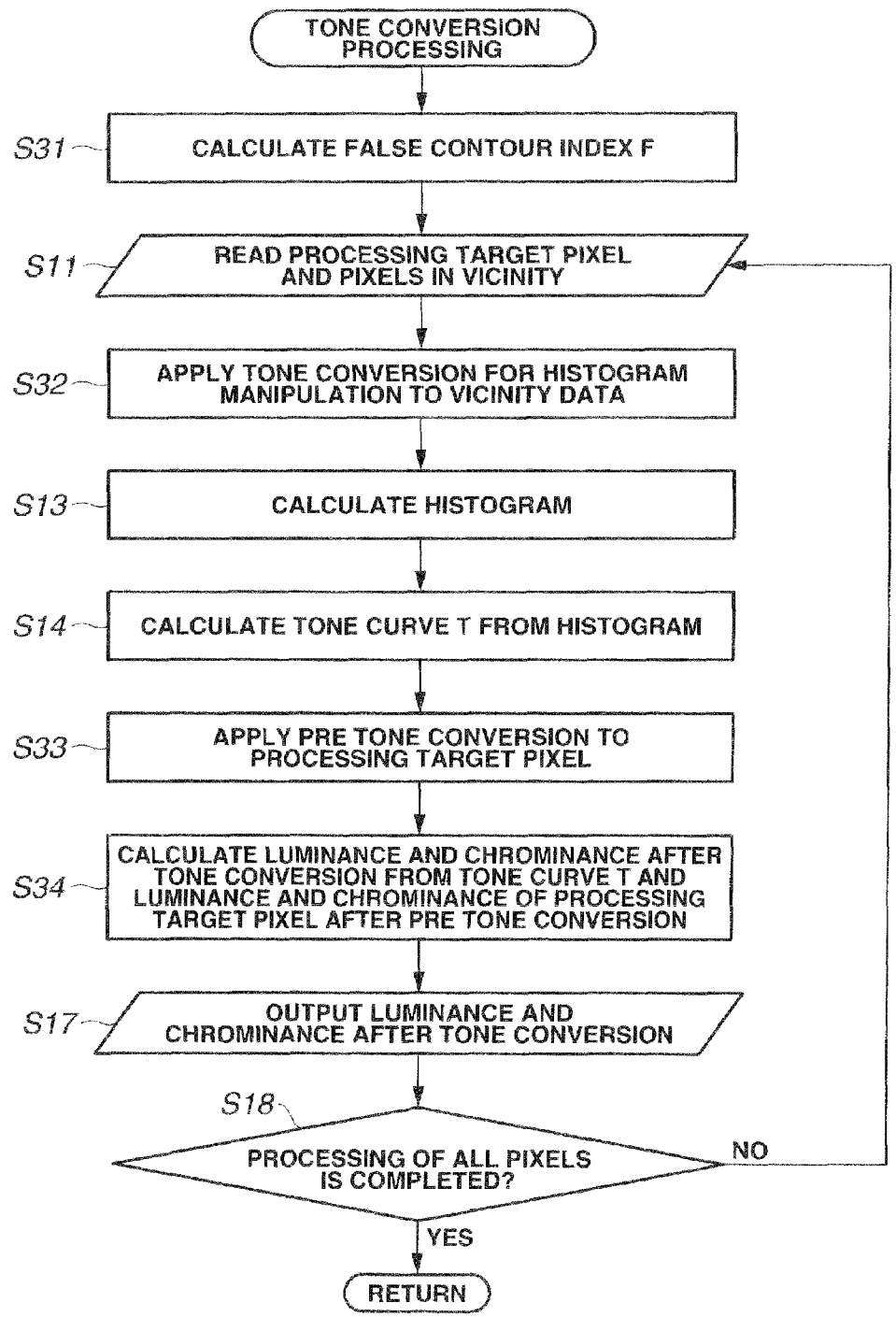
FIG. 23 is a flow chart showing a tone conversion processing according to the embodiment 3.

FIGS. 20 to 23 illustrate an embodiment 3 of the present invention. FIG. 20 is a block diagram showing a configuration of a tone converting section, FIG. 21 is a graph showing tone conversion characteristics V1(x) and V2(x) used by a pre tone converting section, FIG. 22 is a graph showing tone conversion characteristics H1(x) and H2(x) used by the histogram calculating section, and FIG. 23 is a flow chart showing a tone conversion processing.

In the embodiment 3, the same parts as those in the embodiments 1 and 2 described above are denoted by the same reference numerals, and descriptions thereof will be omitted, and only differences from the embodiments 1 and 2 will be described.

An image processing apparatus according to the present embodiment has a tone converting section 304 shown in FIG. 20 instead of the tone converting section 104 according to the embodiment 1 described above shown in FIG. 1. The tone converting section 304 is connected to the other sections in the image processing apparatus in the same way as the tone converting section 104, and the other sections in the image processing apparatus and the operation of the whole of the image processing apparatus are the same as those of the image processing apparatus shown in FIG. 1.

With reference to FIG. 20, the tone converting section 304 will be described.

The tone converting section 304 includes a pre tone converting section 310 (controlling means, means of performing a common tone conversion on an entire image), an internal buffer 311, a false contour detecting section 312 (false contour detecting means), a histogram calculating section 313 (tone correcting means, controlling means), and a tone curve applying section 315 (tone correcting means). The color converting section 103 is connected to the internal buffer 311. The internal buffer 311 is connected to the pre tone converting section 310, the false contour detecting section 312 and the histogram calculating section 313. The false contour detecting section 312 is connected to the pre tone converting section 310 and the histogram calculating section 313. The pre tone converting section 310 and the histogram calculating section 313 are connected to the tone curve applying section 315. The tone curve applying section 315 is connected to the band enhancing section 105.

Next, operation of the tone converting section 304 will be described.

The tone converting section 304 differs from the tone converting section 104 according to the embodiment 1 described above in that the pixel values for all the pixels after color conversion inputted from the color converting section 103 are first accumulated in the internal buffer 311.

Then, after the whole of the image after color conversion is accumulated in the internal buffer 311, the false contour detecting section 312 detects whether or not a false contour occurs at a processing target image.

More specifically, the false contour detecting section 312 sequentially reads each pixel of the image in the internal buffer 311, converts the luminance and chrominance of the read pixel into R, G and B values, and determines whether or not each color component is saturated. Then, the false contour detecting section 312 increments an internal counter C by 1 if the number of saturated color components is 1 or 2. The counter C is initialized to 0 before the processing is started.

When the processing of all the processing target pixels of the image in the internal buffer 311 is completed, the false contour detecting section 312 calculates the false contour index F that indicates the degree of false contour occurrence for the entire image according to an equation F=C/(total number of pixels) and outputs the calculated false contour index F to the pre tone converting section 310 and the histogram calculating section 313.

When the false contour index F is inputted to the pre tone converting section 310, the pre tone converting section 310 performs a pre tone conversion processing on each pixel of the image in the internal buffer 311 before the tone curve applying section 315 performs a space-variant histogram equalization. In this step, the pre tone converting section 310 controls the pre tone conversion characteristics as described below depending on the inputted false contour index F.

That is, the pre tone converting section 310 first calculates the R value R_c, the G value G_c and the B value B_c of the processing target pixel Pc based on the luminance Y_c and chrominances Cr_c and Cb_c of the processing target pixel Pc. Then, according to the following Equation 15, the pre tone converting section 310 calculates the R value R_c', the G value G_c' and the B value B_c' after pre tone conversion based on the two kinds of tone conversion characteristics (tone curves) V1(x) and V2(x) previously stored therein and the false contour index F described above.

$$R\_c' = V1(R\_c) \times F + V2(R\_c) \times (1-F)$$

$$G\_c' = V1(G\_c) \times F + V2(G\_c) \times (1-F)$$

$$B\_c' = V1(B\_c) \times F + V2(B\_c) \times (1-F) \qquad \text{[Equation 15]}$$

FIG. 21 shows examples of the tone conversion characteristics V1(x) and V2(x). As shown in the drawing, the tone conversion characteristics V1(x) is characterized in that the tone variation in a bright area is more moderate than the tone variation of the tone conversion characteristics V2(x). If the pre tone conversion shown by the Equation 15 is performed using the tone conversion characteristics V1(x) and V2(x), a tone conversion that compresses the tone of a highlight more significantly as the false contour index F increases is applied to the processing target pixels.

Then, the pre tone converting section 310 converts the R value R_c', the G value G_c' and the B value B_c' after pre tone conversion back into the luminance Y_c' and the chrominances Cr_c' and Cb_c'. Then, the pre tone converting section 310 outputs the luminance Y_c' and the chrominances Cr_c' and Cb_c' resulting from the processing to the tone curve applying section 315.

In parallel with the operation by the pre tone converting section 310 described above, the histogram calculating section 313 reads pixel values of pixels in a predetermined vicinity surrounding the pixel being processed by the pre tone converting section 310 from the internal buffer 311. For example, the pixels in the vicinity whose pixel values are read by the histogram calculating section 313 are the same as the pixels in the embodiment 1 described above shown in FIG. 3. Based on the read pixel values of the pixels in the vicinity, the histogram calculating section 313 creates a tone curve T used for histogram equalization. In this step, the histogram calculating section 313 controls the shape of the tone curve T as described below using the false contour index F outputted from the false contour detecting section 312.

That is, the histogram calculating section 313 previously stores two kinds of tone conversion characteristics H1(x) and H2(x). Based on the tone conversion characteristics H1(x) and H2(x) and the false contour index F described above, the histogram calculating section 313 applies a tone conversion depending on the false contour index F to a luminance Y_j (j represents integers 1 to n) of the pixels in the vicinity according to the following Equation 16, thereby calculating a luminance Y_j'.

$$Y\_j'=H1(Y\_j)\times(1-F)+H2(Y\_j)\times F \quad \text{[Equation 16]}$$

FIG. 22 shows preferred examples of the shape of the functions representing the tone conversion characteristics H1(x) and H2(x). The tone conversion characteristics H1(x) are characteristics that make a bright area brighter, and the tone conversion characteristics H2(x) are characteristics that make a bright area darker. If the tone conversion characteristics H1(x) is applied to an image, the histogram for a bright area is biased to a brighter side, and the tone curve for histogram equalization, which is a cumulative histogram thereof, has a characteristic that the tone curve more abruptly vary in the bright area. To the contrary, if the tone conversion characteristics H2(x) is applied to an image, the tone curve for histogram equalization has a characteristic that the tone curve more abruptly vary in a dark area. Therefore, if the calculation shown by the Equation 16 is performed, in a bright area, the tone curve T for histogram equalization varies more moderately as the false contour index F increases and varies more abruptly as the false contour index F decreases. Thus, as the false contour index F increases, the tone variation in a bright area becomes more moderate, so that the false contour can be more effectively prevented from being prominent.

Then, as with the histogram calculating section 113 in the embodiment 1 described above, the histogram calculating section 313 determines the cumulative histogram for the luminance Y_j' after tone conversion (j represents integers 1 to n) of the pixels in the vicinity, and scales the cumulative values so that the cumulative value for the input maximum pixel value M equals to the same value M, thereby creating the tone curve T that converts an input pixel value into an output pixel value. Then, the histogram calculating section 313 outputs the calculated tone curve T to the tone curve applying section 315.

Based on the luminance Y_c' and chrominances Cr_c' and Cb_c' after pre tone conversion of the processing target pixel inputted from the pre tone converting section 310 and the tone curve T(x) inputted from the histogram calculating section 113, the tone curve applying section 315 calculates the final luminance Y_c" and chrominances Cr_c" and Cb_c" after tone conversion according to the following Equation 17 and outputs the calculated luminance and chrominances to the band enhancing section 105.

$$Y\_c''=T(Y\_c')$$

$$Cr\_c''=Cr\_c'\times Y\_c''/Y\_c'$$

$$Cb\_c''=Cb\_c'\times Y\_c''/Y\_c' \quad \text{[Equation 17]}$$

According to the processing described above, in the case where the false contour detecting section 312 determines that many false contours occur, the pre tone converting section 310 and the histogram calculating section 313 serve to perform a tone conversion having a characteristic that the tone of the bright area is relatively compressed. On the other hand, in the case where the false contour detecting section 312 determines that less false contours occur, a space-variant tone conversion is performed to relatively expand the tone of the bright area, so that an image a false contour in which is less prominent and the tone of which is converted to be close to the tone perceived by human vision can be produced.

Furthermore, in the present embodiment, the processing can also be implemented with software. The flow of the whole of the processing by the image processing program according to the present embodiment is essentially the same as the flow according to the embodiment 1 described above shown in FIG. 12. However, the tone conversion processing in step S4 in FIG. 12 is replaced with a tone conversion processing shown in FIG. 23. In the processing shown in FIG. 23, steps in which the same processings as those in the embodiment 1 described above shown in FIG. 13 are performed are denoted by the same reference numerals, and descriptions thereof will be omitted.

At the beginning of the processing, the false contour index F that indicates the degree of false contour occurrence for an input image is calculated (step S31). The processing is the same as the processing performed by the false contour detecting section 312 described above.

Then, the processing in step S11 described above is performed.

Then, before calculation of the histogram a tone conversion is performed on the luminance in vicinity data (step S32). The processing is the same as the processing performed by the histogram calculating section 313 described above in the manner described above.

Then, the processings in steps S13 and S14 described above are performed.

Then, the luminance and chrominance of the processing target pixel Pc are temporarily converted into R, G and B signals, and the R, G and B signals are subjected to a pre tone conversion according to the Equation 15 and then converted back into a luminance signal and a chrominance signal (step S33). The processing is the same as the processing performed by the pre tone converting section 310 described above.

Then, the Equation 17 is applied to the tone curve T and the luminance and chrominance of the processing target pixel after pre tone conversion, thereby calculating the luminance and chrominance after tone conversion (step S34). The processing is the same as the processing performed by the tone curve applying section 315 described above.

Then, the procedures from step S17 are performed as described above.

According to the embodiment 3 described above, since the space-variant tone conversion is performed an image close to the image perceived by human vision can be produced. In addition, since the controlling means corrects the tone correction characteristics of the tone correcting means to make a false contour less prominent according to the degree of false contour occurrence determined by the false contour detecting means, and the tone correcting means performs the tone correction by using the corrected tone correction characteristics, a false contour is made less prominent in a scene in which the false contour occurs.

In addition, even in the case where many false contours occur, since the characteristics of the common tone conversion performed on the whole of the image are modified to make the false contours less prominent, the false contours can be made less prominent.

In addition, since the tone characteristics used for space-variant tone conversion are corrected depending on the degree of false contour occurrence, the false contours can be made less prominent.

In addition, since the degree of false contour occurrence is evaluated for the entire image, the processing can be simplified without significantly compromising the effect of making the false contours less prominent.

[Supplementary Notes]

An image processing apparatus according to a first aspect of the present invention is an image processing apparatus that processes a color image composed of color signals of a plurality of colors, including tone correcting means that performs different tone corrections on pixels at different positions in the color image, false contour detecting means that calculates the degree of false contour occurrence for the color image based on the difference in signal saturation level between the color signals, and controlling means that controls characteristics of the tone corrections based on the result of the calculation by the false contour detecting means.

<Descriptions in Embodiments>

Specific examples of the present aspect of the present invention are described in the embodiments 1 to 3 and the modifications thereof.

The tone correcting means that performs different tone corrections on pixels at different positions corresponds, for example, to the combination of the histogram calculating section 113, the tone curve determining section 114 and the tone curve applying section 115, the combination of the histogram calculating section 113, the tone curve applying section 215 and the weighted averaging section 218, the combination of the histogram calculating section 113, the tone curve applying section 215 and the weighted averaging section 220 or the combination of the histogram calculating section 313 and the tone curve applying section 315.

The false contour detecting means corresponds, for example, to the false contour detecting section 112, the false contour detecting section 116, the false contour detecting section 119, the weighted averaging section 220 or the false contour detecting section 312.

The controlling means corresponds, for example, to the tone curve determining section 114, the combination of the weight calculating section 217 and the weighted averaging section 218, the weighted averaging section 220, or the combination of the pre tone converting section 310 and the histogram calculating section 313.

Furthermore, an image processing apparatus according to a second aspect of the present invention is the image processing apparatus according to the first aspect described above, in which the controlling means controls the characteristics of the tone corrections so that a tone correction curve that determines the tone correction characteristics for each pixel varies moderately in a saturated area.

<Descriptions in Embodiments>

Specific examples of the present aspect of the present invention are described in the embodiment 1.

The expression "controls the characteristics of the tone corrections so that a tone correction curve that determines the characteristics of the tone correction of each pixel varies moderately in a saturated area" corresponds, for example, to the tone curve determining section 114 adjusting the tone curve according to the Equation 1.

<Effects and Advantages>

In the case where the degree of false contour occurrence is high, since the tone conversion characteristics for a highlight is moderate, the false contour at the highlight can be made less prominent.

Furthermore, an image processing apparatus according to a third aspect of the present invention is the image processing apparatus according to the first aspect described above, in which the tone correcting means has means that performs a common tone conversion on the entire image before the tone correcting means performs different tone corrections on pixels at different positions, and the controlling means modifies the characteristics of the common tone conversion for the entire image according to the result of the calculation by the false contour detecting means.

<Descriptions in Embodiments>

Specific examples of the present aspect of the present invention are described in the embodiment 3.

The means that performs a common tone conversion on the entire image corresponds, for example, to the pre tone converting section 310.

The controlling means that modifies the characteristics of the common tone conversion corresponds, for example, to the pre tone converting section 310 and the histogram calculating section 313.

<Effects and Advantages>

In the case where many false contours occur, the characteristics of the common tone conversion performed on the entire image are modified to make the false contours less prominent, and therefore, the false contours can be made less prominent.

An image processing apparatus according to a fourth aspect of the present invention is the image processing apparatus according to the first aspect described above, in which the tone correcting means has means that performs a common tone conversion on the entire image and means that combines the result of the different tone corrections performed on pixels at different positions and the result of the common tone conversion at a predetermined combination ratio, and the controlling means modifies the combination ratio according to the result of the calculation by the false contour detecting means.

<Descriptions in Embodiments>

Specific examples of the present aspect of the present invention are described in the embodiment 2 and the modifications thereof.

The means that performs a common tone conversion on the entire image corresponds, for example, to the normal tone converting section 216.

The means that combines at a predetermined combination ratio corresponds, for example, to the weighted averaging section 218 or the weighted averaging section 220.

The controlling means that modifies the combination ratio corresponds, for example, to the combination of the weight calculating section 217 and the weighted averaging section 218 or the weighted averaging section 220.

<Effects and Advantages>

In the case where many false contours occur, the combination ratio is controlled to bring the tone conversion characteristics for each pixel close to the characteristics of the common tone conversion for the whole of the pixels, and therefore, the false contours can be made less prominent.

An image processing apparatus according to a fifth aspect of the present invention is the image processing apparatus according to the first aspect described above, in which the tone correcting means has temporary tone correcting means that performs a temporary tone correction and primary tone correcting means that performs a final tone correction, the false contour detecting means calculates the degree of false contour occurrence based on the result of the processing by the temporary tone correcting means, and the controlling means controls characteristics of the primary tone correction according to the result of the calculation by the false contour detecting means.

<Descriptions in Embodiments>

Specific examples of the present aspect of the present invention are described in the embodiment 2.

The temporary tone correcting means corresponds, for example, to the normal tone converting section 216 or the tone curve applying section 215.

The primary tone correcting means corresponds, for example, to the weighted averaging section 220.

The expression "calculates the degree of false contour occurrence based on the result of the processing by the temporary tone correcting means" corresponds, for example, to the weighted averaging section 220 calculating the second false contour index F' from the chromaticness S' after histogram equalization.

The controlling means corresponds to the weighted averaging section 220.

<Effects and Advantages>

Since the degree of false contour occurrence is determined after temporary tone conversion, and the primary tone conversion is controlled based on the result of the determination, the tone control to make false contours less prominent can be performed with higher reliability.

An image processing apparatus according to a sixth aspect of the present invention is the image processing apparatus according to any one of the first to fifth aspects described above, in which the false contour detecting means determines whether or not a false contour occurs at each pixel of the color image and calculates a false contour index that indicates the degree of false contour occurrence based on the ratio between the total number of pixels for which it is determined that a false contour occurs and the total number of pixels forming the color image.

<Descriptions in Embodiments>

Specific examples of the present aspect of the present invention are described in the second modification of the embodiment 1 and the embodiment 3.

The false contour detecting means corresponds, for example, to the false contour index calculating section 120 or the false contour detecting section 312.

<Effects and Advantages>

Since the degree of false contour occurrence is evaluated for the entire image, the processing can be simplified without significantly compromising the effect of making the false contour less prominent.

An image processing apparatus according to a seventh aspect of the present invention is the image processing apparatus according to any one of the first to fifth aspects described above, in which the false contour detecting means sets a predetermined vicinity area for each pixel, determines whether or not a false contour occurs for each pixel in the vicinity area, and calculates a false contour index that indicates the degree of false contour occurrence for each pixel based on the ratio between the total number of pixels in the vicinity area for which it is determined that a false contour occurs and the total number of pixels in the vicinity area.

<Descriptions in Embodiments>

Specific examples of the present aspect of the present invention are described in the embodiments 1 to 2 (including the first modification of the embodiment 1 and the modifications of the embodiment 2).

The false contour detecting means corresponds, for example, to the false contour detecting section 112, the false contour detecting section 116, the false contour detecting section 119 or the weighted averaging section 220.

<Effects and Advantages>

Since the degree of false contour occurrence is evaluated for each pixel, the quality of the image can be improved.

An image processing apparatus according to a eighth aspect of the present invention is the image processing apparatus according to any one of the first to fifth aspects described above, in which the color image is a color dynamic image composed of a plurality of frames or fields, and in processing of the color dynamic image, the false contour detecting means calculates the degree of false contour occurrence for each frame or field by smoothing, over the frames or fields, a false contour index that indicates the degree of false contour occurrence and is calculated for each frame or field.

<Descriptions in Embodiments>

Specific examples of the present aspect of the present invention are described in the first and second modifications of the embodiment 1.

The false contour detecting means corresponds, for example, to the false contour detecting section 116 or the false contour detecting section 119.

<Effects and Advantages>

Since the tone conversion characteristics do not significantly vary with the frame or field of the color dynamic image, the quality of the dynamic image can be improved.

The present invention is not limited to the embodiments described above, and in practice, the components can be modified without departing from the spirit of the present invention. In addition, the plurality of components disclosed in the embodiments described above can be appropriately combined to implement various aspects of the present invention. For example, some of the components described in the embodiments may be omitted. Furthermore, components in different embodiments may be appropriately used in combination. In this way, of course, various modifications or applications of the present invention are possible without departing from the spirit of the present invention.

What is claimed is:

1. An image processing apparatus that processes a color image composed of color signals of a plurality of colors, the apparatus comprising a hardware processor which performs functions of:

a tone correcting section that performs different tone corrections on pixels at different positions in the color image;

a false contour detecting section that calculates a degree of false contour occurrence for the color image based on a difference in signal saturation level between the color signals; and a controlling section that controls characteristics of the tone corrections based on a result of the calculation by the false contour detecting section such that a tone correction curve that determines the tone correction characteristics for each pixel varies moderately in a saturated area.

2. The image processing apparatus according to claim 1, wherein the tone correcting section performs a common tone conversion on the entire image before performing the different tone corrections on the pixels at different positions, and wherein the controlling section modifies characteristics of the common tone conversion for the entire image according to the result of the calculation by the false contour detecting section.

3. The image processing apparatus according to claim 1, wherein the tone correcting section performs a common tone conversion on the entire image and combines a result of the different tone corrections performed on the pixels at different positions and a result of the common tone conversion at a predetermined combination ratio, and wherein the controlling section modifies the combination ratio according to the result of the calculation by the false contour detecting section.

4. The image processing apparatus according to claim 1, wherein:

the tone correcting section comprises a temporary tone correcting section that performs a temporary tone correction and a primary tone correcting section that performs a final tone correction, the false contour detecting section calculates the degree of false contour occurrence based on a result of the processing by the temporary tone correcting section, and the controlling section controls characteristics of the final tone correction according to the result of the calculation by the false contour detecting section.

5. The image processing apparatus according to claim 1, wherein the false contour detecting section determines whether or not a false contour occurs at each pixel of the color image and calculates a false contour index that indicates the degree of false contour occurrence based on a ratio between a total number of pixels for which it is determined that the false contour occurs and a total number of pixels forming the color image.

6. The image processing apparatus according to claim 1, wherein the false contour detecting section sets a predetermined vicinity area for each pixel, determines whether or not a false contour occurs for each pixel in the vicinity area, and calculates a false contour index that indicates a degree of false contour occurrence for each pixel based on a ratio between a total number of pixels in the vicinity area for which it is determined that the false contour occurs and a total number of pixels in the vicinity area.

7. The image processing apparatus according to claim 1, wherein the color image is a color dynamic image composed of a plurality of frames or fields, and in processing of the color dynamic image, the false contour detecting section calculates the degree of false contour occurrence for each frame or field by smoothing, over the frames or fields, a false contour index that indicates the degree of false contour occurrence and is calculated for each frame or field.

8. The image processing apparatus according to claim 1, wherein the controlling section controls the characteristics of the tone corrections such that as the degree of false contour occurrence calculated by the false contour detecting section increases, tone correction characteristics in a brighter area become more moderate.

9. The image processing apparatus according to claim 1, wherein:

the tone correcting section comprises:

a histogram calculating section that applies a first tone conversion to each pixel of the color image using previously stored first tone conversion characteristics that make a bright area brighter, and previously stored second tone conversion characteristics that make a bright area darker, and calculates third tone conversion characteristics using a cumulative histogram of the color image to which the first tone conversion is applied; and a tone curve applying section that applies a second tone conversion to the color image to which the first tone conversion is not applied using the third tone conversion characteristics calculated by the histogram calculating section; and the controlling section performs control such that as the degree of false contour occurrence calculated by the false contour detecting section increases, an application ratio of the second tone conversion becomes higher than an application ratio of the first tone conversion.

10. The image processing apparatus according to claim 1, further comprising a section that performs a common tone conversion on an entire color image;

wherein the tone correcting section performs the tone corrections on the color image on which the tone conversion is performed by the section that performs the common tone conversion on the entire color image; and the controlling section controls characteristics of the tone conversion performed by the section that performs the common tone conversion on the entire color image such that as the degree of false contour occurrence calculated by the false contour detecting section increases, the tone in a bright area becomes more compressed.

11. The image processing apparatus according to claim 1, wherein:

the tone correcting section comprises:

a histogram calculating section that calculates a cumulative histogram of the color image and creates fourth tone conversion characteristics using the cumulative histogram;

a tone curve determining section that calculates sixth tone conversion characteristics of the color image using the fourth tone conversion characteristics created by the histogram calculating section and previously stored fifth tone conversion characteristics to provide a modulate tone variation in a bright area, and calculates seventh conversion characteristics using the fourth tone conversion characteristics and the sixth tone conversion characteristics; and a tone curve applying section that performs a tone conversion on the color image using the seventh tone conversion characteristics determined by the tone curve determining section; and the controlling section calculates the sixth tone conversion characteristics such that as a pixel value in the color image becomes larger, an application ratio of more moderate tone conversion characteristics in the fourth tone conversion characteristics and the fifth tone conversion characteristics becomes higher, and calculates the seventh tone conversion characteristics such that as the degree of false contour occurrence calculated by the false contour detecting section increases, an application ratio of the sixth tone conversion characteristics becomes higher than an application ratio of the fourth tone conversion characteristics.

12. The image processing apparatus according to claim 1, wherein the tone correcting section comprises:
   a section that performs a common tone conversion on an entire color image by a tone conversion correction curve that is set to provide a moderate tone variation in a bright area; and
   a section that combines the color image on which the tone conversion is performed by a tone conversion curve created based on a cumulative histogram of the color image and the color image on which the tone conversion is performed by the section that performs the common tone conversion, at a predetermined combination ratio; and
   wherein the controlling section increases the combination ratio of the color image on which the tone conversion is performed by the section that performs the common tone conversion as the degree of false contour occurrence calculated by the false contour detecting section increases.

13. The image processing apparatus according to claim 1, wherein the tone correcting section comprises a temporary tone correcting section that performs a temporary tone correction and a primary tone correcting section that performs a final tone correction, and
   wherein the controlling section newly calculates a degree of false contour occurrence based on a result of processing by the temporary tone correcting section and the degree of false contour occurrence calculated by the false contour detecting section, and controls characteristics of the primary tone correction such that as the newly calculated degree of the false contour occurrence increases, a variation of a tone correction curve in a bright area to be used in the primary tone correcting section becomes more moderate.

14. A non-transitory computer-readable recording medium having an image processing program stored thereon that controls a computer to process a color image composed of color signals of a plurality of colors, the image processing program controlling the computer to perform functions comprising:
   performing different tone corrections on pixels at different positions in the color image;
   calculating a degree of false contour occurrence for the color image based on a difference in signal saturation level between the color signals; and
   controlling characteristics of the tone corrections based on a result of the calculating such that a tone correction curve that determines the tone correction characteristics for each pixel varies moderately in a saturated area.

15. The non-transitory computer-readable recording medium according to claim 14, wherein the controlling includes controlling the characteristics of the tone corrections such that as the calculated degree of the false contour occurrence increases, tone conversion characteristics in a bright area become more moderate.

* * * * *